US012667993B2

(12) United States Patent
Bow

(10) Patent No.: US 12,667,993 B2
(45) Date of Patent: Jun. 30, 2026

(54) WORK FENCE APPARATUS AND ATTACHMENTS

(71) Applicant: Bow Products Inc, Superior, CO (US)

(72) Inventor: D. Keith Bow, Corfu, NY (US)

(73) Assignee: Bow Products, Inc., Superior, CO (US)

( * ) Notice: Subject to any disclaimer, the term of this patent is extended or adjusted under 35 U.S.C. 154(b) by 238 days.

(21) Appl. No.: 18/511,035

(22) Filed: Nov. 16, 2023

(65) Prior Publication Data

US 2024/0165846 A1 May 23, 2024

Related U.S. Application Data

(60) Provisional application No. 63/426,059, filed on Nov. 17, 2022.

(51) Int. Cl.
*B27B 27/02* (2006.01)

(52) U.S. Cl.
CPC .................................... *B27B 27/02* (2013.01)

(58) Field of Classification Search
CPC ......... B27B 27/02; B27B 27/10; B27B 27/00; B27B 27/04; B27B 27/06; B27B 27/08; B27C 5/04
See application file for complete search history.

(56) References Cited

U.S. PATENT DOCUMENTS

| | | | |
|---|---|---|---|
| 785,699 A | | 3/1905 | Bemis |
| 1,938,548 A | | 12/1933 | Tautz |
| 4,521,006 A | | 6/1985 | Waters |
| 4,798,113 A | | 1/1989 | Viazanko |
| 4,817,482 A | | 4/1989 | Dunaway, Jr. et al. |
| 4,817,693 A | * | 4/1989 | Schuler ..................... B27C 5/04 144/287 |
| 5,018,562 A | | 5/1991 | Adams |
| 5,617,909 A | | 4/1997 | Duginske |
| 5,768,966 A | | 6/1998 | Duginske |
| 6,557,601 B1 | | 5/2003 | Taylor |
| 6,647,847 B2 | | 11/2003 | Hewitt et al. |
| 6,672,348 B2 | | 1/2004 | Ransom et al. |
| 6,736,042 B2 | | 5/2004 | Behne et al. |
| 6,851,345 B1 | | 2/2005 | Kennelly et al. |
| 6,880,442 B2 | | 4/2005 | Duginske |
| 7,127,976 B1 | | 10/2006 | Fitzsimmons |
| 7,416,000 B2 | | 8/2008 | White et al. |
| 7,594,459 B2 | | 9/2009 | Miller et al. |

(Continued)

FOREIGN PATENT DOCUMENTS

EP 4104989 A1 12/2022

OTHER PUBLICATIONS

International Search Report for PCT/US2023/080112 Oct. 21, 2024.

(Continued)

*Primary Examiner* — Bobby Yeonjin Kim
(74) *Attorney, Agent, or Firm* — Dawson Law Firm, P.C.

(57) ABSTRACT

Disclosed are various work fence embodiments that may be employed separately or in combination with one another, including (a) an extended fence having at least one end extending beyond the work surface edge and a feed support(s) suitable for attachment to an extended or sliding fence, (b) an improved sliding work fence for use with cutting and shaping equipment such as a table saw, and (c) a work fence height extension including a T-slot track(s) along or adjacent a top surface

26 Claims, 31 Drawing Sheets

(56) References Cited

U.S. PATENT DOCUMENTS

| | | | |
|---|---|---|---|
| 7,798,187 | B1 | 9/2010 | Duginske |
| 7,926,523 | B2 | 4/2011 | Williams et al. |
| 7,930,960 | B2 | 4/2011 | Duginske |
| 7,942,174 | B2 | 5/2011 | Kozina et al. |
| 8,312,799 | B2 | 11/2012 | Frolow |
| 8,327,893 | B2 | 12/2012 | Jesberger |
| 8,424,434 | B2 | 4/2013 | Koegel et al. |
| 8,826,788 | B2 | 9/2014 | Rybka |
| 9,221,188 | B1 | 12/2015 | Wisen |
| 9,272,439 | B2 | 3/2016 | Dammertz |
| 10,245,746 | B2 | 4/2019 | Smith |
| 10,315,329 | B2 | 6/2019 | Burke et al. |
| 10,357,893 | B1 | 7/2019 | Frolov et al. |
| 10,688,572 | B2 | 6/2020 | Fulmer et al. |
| 10,695,849 | B2 | 6/2020 | Frolov |
| 11,097,388 | B2 | 8/2021 | Dutterer |
| 11,338,372 | B2 | 5/2022 | Duginske |
| 11,383,312 | B2 | 7/2022 | Gibson et al. |
| 11,554,513 | B1 | 1/2023 | Larson |
| 11,648,615 | B2 | 5/2023 | Smith |
| 11,772,296 | B2 | 10/2023 | Fontana |
| 11,845,135 | B2 | 12/2023 | Smith |
| 2006/0266182 | A1 | 11/2006 | Balolia |
| 2007/0251366 | A1 | 11/2007 | Dawley |
| 2007/0272066 | A1 | 11/2007 | Phillips et al. |
| 2008/0127794 | A1 | 6/2008 | Jaksha |
| 2008/0257124 | A1 | 10/2008 | Yu |
| 2012/0032382 | A1 | 2/2012 | Hendrickson et al. |
| 2013/0298742 | A1 | 11/2013 | Fuchs |
| 2016/0346850 | A1 * | 12/2016 | Cox ..................... B23D 47/025 |
| 2018/0185935 | A1 * | 7/2018 | Smith .................. B23D 47/025 |
| 2019/0270146 | A1 | 9/2019 | Gass et al. |
| 2022/0184719 | A1 | 6/2022 | Capaccioli et al. |
| 2022/0355428 | A1 * | 11/2022 | Qin ........................ B23Q 3/007 |

OTHER PUBLICATIONS

Mast-R-Fence III webpage.
188—VerySuperCool Tools After-Market Tablesaw Fence webpage.
Jays Custom Creations web page.

* cited by examiner

WORK FENCE APPARATUS AND ATTACHMENTS

This application claims priority under 35 U.S.C. § 119(e) to U.S. Provisional Patent Application No. 63/426,059, for a WORK FENCE CONFIGURATIONS AND APPLICATIONS, filed Nov. 17, 2022 by D. Keith Bow, which is hereby incorporated by reference in its entirety.

Disclosed in embodiments herein are a plurality of alternative work fence embodiments, one such embodiment is an extended fence suitable for use on table saws, band saws and similar tools where a workpiece slides across a table and a fence is used to control the workpiece as it moves relative to a cutting or shaping mechanism such as a saw blade. The extended fence is longer than the work table width, thereby allowing for easier alignment of the workpiece on the table and relative to the cutting or shaping mechanism. Further features of the extended fence include one or more supports attached to the fence. Still other embodiments include a fence configuration where the height of the fence is increased, such as a Beisemeyer-type fence, and various combinations thereof. And further enhancements to the extended fence include work supports for the extended fence, folding fence extension arms and the like.

BACKGROUND AND SUMMARY

As will be appreciated, it is often the case where a workpiece is longer than a fence, say on a table saw. In such cases, the workpiece slides against the stationary fence, and there is a likelihood that, as the workpiece is advanced, the cut portion "walks" or moves away from being parallel with the fence as it advances beyond the cutting blade, and past the end of the stationary fence.

The following describes embodiments of improved work fences that are designed to address and overcome issues associated with the cutting of long workpieces, among other difficulties. And, as the various embodiments are described below, it will be further apparent that one or more features of a particular embodiment may be combined with those of a different embodiment. As one example of such a combination, while not depicted specifically, the disclosed feed supports may be included on either a stationary extended fence or on a sliding fence configuration. Accordingly, the various combinations are intended to be included within the scope of the following disclosure.

In each of these embodiments, one goal is to make the fence against which the workpiece slides both taller longer than the work table (front to back width) and to include a flat face with a standard T Slot on the top of the front face as well as a T Slot on the top of the fence, where the added slots provide utility for hold-down and fixturing aids. Most fences built by saw manufactures are only about three inches in height and have no slot on the face. As described herein, there is a need for taller fences and for T-slots or T-channels that, in combination with one or more devices such as a featherboard, provide hold-down capability for wood or other workpieces passing along the fence.

As discussed in detail below, tall fences of various heights and sizes (e.g., approx. 5 in. (12.7 cm) tall, 1 in. (2.5 cm) thick, and 24-47 in. (10.2-120 cm) long) with a flat face surface along the bottom and a T-slot adjacent the top edge to facilitate the attachment of other components. In the various configurations, the additional components may include hold-downs such as a Bow FeatherPro™ as disclosed in U.S. Pat. No. 10,226,880 (Mar. 12, 2019) and U.S. Pat. No. 10,843,281 (Nov. 24, 2020), which are both hereby incorporated by reference in their entirety, as well as, clamps, feed supports and the like. At least one embodiment also provides a clamping apparatus to attach the extended or extendable fence to existing fences. This allows a user the full positioning functionality of the pre-existing fence that came with the saw, while having a taller, more functional fence face. In other words, in an add-on configuration, the disclosed fence embodiments will not impede the functionality or safety of the saw with normal or standard operation.

In one embodiment of the extended and extendable fence, infeed/outfeed table or feed supports are disclosed that mount to the fence. These feed supports may be sold separately or in kits along with a fence. They attach to the fence on each or at least one side of the saw, and provide support to a long workpiece as it is being fed along the fence, essentially extending the table surface along the fence. To use the feed supports you would need to use a fence at least approximately 6 in. (15.2 cm) longer than the saw's fence or table so that the feed supports mount and secure themselves beyond the saw's table surface. One particular application, as illustrated in FIGS. 10-12 and 18-21, is applicable to the portable saw or contractor saw, which are often used by do-it-yourselfers (DIY), where the table's front-to-back width is in the 20-24 in. (50.8-70 cm) range. The extension fence and feed supports disclosed create many possibilities for user's of these small-table saws and enhance safety when cutting longer boards since the fence acts as a guide for a straighter cut while the supports assist with supporting the workpiece before and/or after being cut.

Also disclosed are vertical fence extensions that, unlike the remaining fences which mount on the face of or replace a saw's fence, are mounted to the top of the common fences that come with a table saw (e.g., Beisemeyer fence). In this case, the fence of FIGS. 37 and 39-45 may only be 2-3 in. (5.08-7.6 cm) of vertical fence extension but include mounts that are unique to fit the existing fence and in combination provide a taller fence (e.g., at least 5 in. (12.7 cm) total) along with an upper horizontal T-slot for hold down capability. These fence enhancements are built specifically for existing fences and will be easy to use, while retaining full functionality of the original base fence.

Furthermore, several of the illustrated embodiments have only a single horizontal slot on the face so that the bottom portion of the fences are planar and do not contain slots or other features that may collect debris or otherwise interfere with the sliding of a workpiece along the fence surface.

The sliding fence embodiment, while described as mounting to an existing fence, is tall and has hold down slots as well, but also slides forward with the material being cut as the material passes by the fence and the sliding fence accompanies the workpiece through the final stage of the cut while holding the material down. And, while not specifically illustrated, it would also be possible to combine the feature of the sliding fence with the attachment mechanisms disclosed for the vertical fence extender, to provide a sliding fence for use with a Beisemeyer-type fence.

Also contemplated by this disclosure is the application of one or more of the various features to existing commercially-available fences. For example, while a sliding fence is disclosed herein as an add-on the sliding feature may be designed into an existing fence so as to allow the modified fence to slide in the direction of the workpiece travel and thereby achieve a functional equivalent to that disclosed herein in relation to the sliding fence embodiment. An intent of this disclosure is to cover the modification of existing fences to include one or more of the features disclosed herein as well.

Also contemplated is the application and use of one or more of the disclosed embodiments and features on both portable and contractor table saws as well as cabinet saws.

Disclosed herein is an extended work fence apparatus for use on a work table, comprising: a linearly-extruded, extended fence member for attachment to a pre-existing work fence adjustably connected to the work table; and at least two attachment mechanisms to operatively connect the extended fence member to the pre-existing work fence, where said extended fence member is of a length greater than the pre-existing work fence and includes a first surface including features for receiving the at least two attachment mechanisms and a second surface having a substantially planar portion extending the length thereof, said extended fence being suitable for guiding a workpiece on the work table.

Also disclosed herein is an apparatus for extending a work fence beyond at least one edge of a work table, including: an extended fence member for adjustable connection to the work table; and at least one feed support for attachment connected to said extended fence member, said at least one feed support comprising: a body having an L-shaped cross section, with a vertical face and a horizontal surface intersecting at a right angle; at least one adjustable connector for affixing the feed support to the extended fence member, so that the feed support is stationary and capable of supporting a workpiece beyond the edge of the work table.

Further disclosed herein is a method for modifying an existing work table having an adjustable fence thereon, comprising: removably attaching an extended fence member on a face of the adjustable fence such that the extended fence member overhangs at least one edge of the work table using at least two attachment mechanisms to operatively connect the extended fence member to the adjustable fence; and attaching at least one adjustable feed support to said extended fence member thereby operatively extending the work table as well.

In some of the disclosed embodiments a sliding work fence is described that is capable of guiding the cut portion of the workpiece, which extends beyond the blade and even beyond the edge of the table, to stabilize the workpiece and prevent an irregular cut or binding of the saw blade. As will be appreciated, while disclosed relative to a table saw, the sliding fence embodiment, as with other embodiments disclosed herein, is suitable for use with other cutting machines as well.

Also disclosed in embodiments herein is a sliding work fence (e.g., for table saws and other cutting machines) operatively connected to a work table, the sliding work fence comprising: an inner linearly-extruded member, for attachment to a pre-existing work fence on the work table; and an outer linearly-extruded member, slidably engaged along a least a first surface with the inner member, said outer member having a substantially planar second surface for contact with a workpiece, wherein the outer member may slide with a workpiece contacting its second surface as the workpiece is slid along the work surface.

Further disclosed in embodiments herein is a sliding work fence for use on a work table, comprising: an inner linearly-extruded member, for attachment to a pre-existing work fence on the work table; an outer linearly-extruded member, slidably engaged along a least a first surface with the inner member, said outer member having a substantially planar second surface for contact with a workpiece (not shown), wherein the outer member may slide with a workpiece contacting its second surface as the workpiece is slid along the work surface, wherein at least one of the inner member and the outer member include a stop mechanism to prevent the separation of the outer member from the inner member when slidably extended relative to one another, and where said outer member further includes at least one T-slot extending longitudinally along at least a surface(s) of the outer member, said T-slot suitable for receiving one or more fastening mechanisms thereby permitting other devices to be removably affixed to the surface(s) of the outer member; a locking mechanism such that the operation of the outer member may be selectively altered between a sliding mode, where it is able to slide relative to the inner member, and a locked mode where it is locked to prevent sliding relative to the inner member

Figure 1:
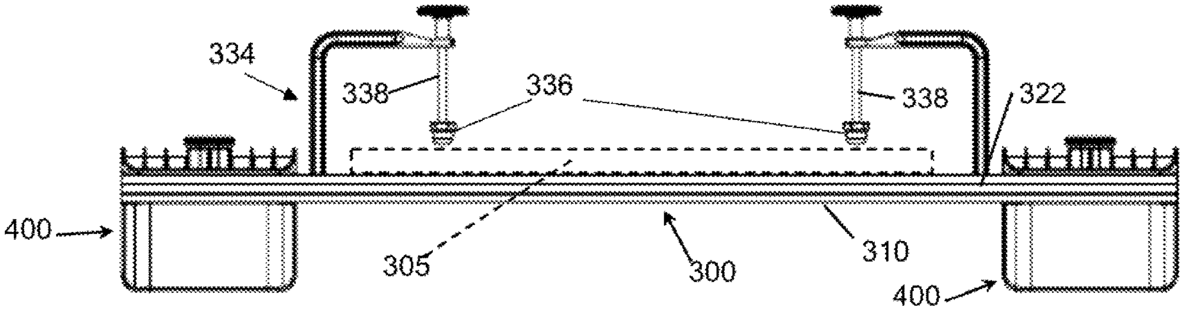
FIGS. 1-4 are various orthographic views of an extended fence and feed supports for use in association with a table saw or similar cutting and forming equipment.
Figure 2:
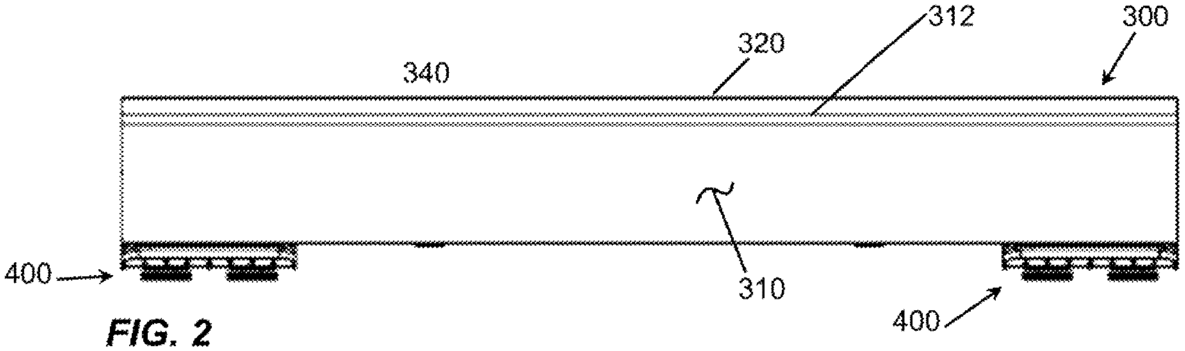

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

The following disclosure of an extended fence and various embodiments of related components and fence extensions, etc. are described and depicted relative to a conventional table saw having a work table or surface for supporting a workpiece moving relative to an adjustable circular saw blade extending upward through the table. However, the disclosure is not intended to be limited to use with table saws, but could include any type or saw or similar shaping feature that works on a table with an adjustable fence attached to control the position of the workpiece. For example, the disclosed fence embodiments may be employed on the work tables of a band saw, router table, etc., and the disclosure and claims should be understood to include these alternative uses.

Referring to the figures, FIGS. 1-8 illustrate various embodiments of an extended fence member 300 along with associated features and components along with optional infeed/outfeed feed supports 400. As used herein, the reference numeral 126 is a general reference to a T-slot or T-shaped slot (also referred to as a T-channel), whereas other reference numerals (e.g., 312, 322, etc.) are used to reference specific slots about the extended fence 300. In one embodiment the fence member 300 attaches to a fence 305 to support a workpiece (not shown) beyond a saw table surface. With regard to the extended work fence, the fence 300 is a tall fence having a height of about 5 in. (12.7 cm) or more, and is designed to attach to the face of a conventional fence 305 or the like using clamps 334, a T-bolt or similar fasteners. Also possible is for fence 300 to be produced with rail attachment components that permit the fence to replace a conventional fence and to adjustably attach directly to the slide rails provided on the saw table. The extended work fence 300 includes a fence face 310 having a longitudinal T-slot 312 extending horizontally along the face at a position near or adjacent the top edge or surface 320. And, top surface 320 also has a longitudinal T-slot 322 therein. Similarly, the rear face 316 of the extended fence 300 also includes one or more longitudinal T-slots.

Engaged within a rear T-slot 330*a*, 330*b* or 600, and extending rearward from the extended work fence 300, are attaching clamps 334 and/or 620, which are designed in a manner to clamp the back of the extended work fence 300 to the face of existing fence 305. The clamps include a tip 336 on the end of a threaded rod 338 which is adjusted using a knob 340 to releasably attach the extended work fence 300 in contact with the face of conventional fence 305. Clamps 334 and an alternative vertical slot configuration are further described below.

Figure 8:
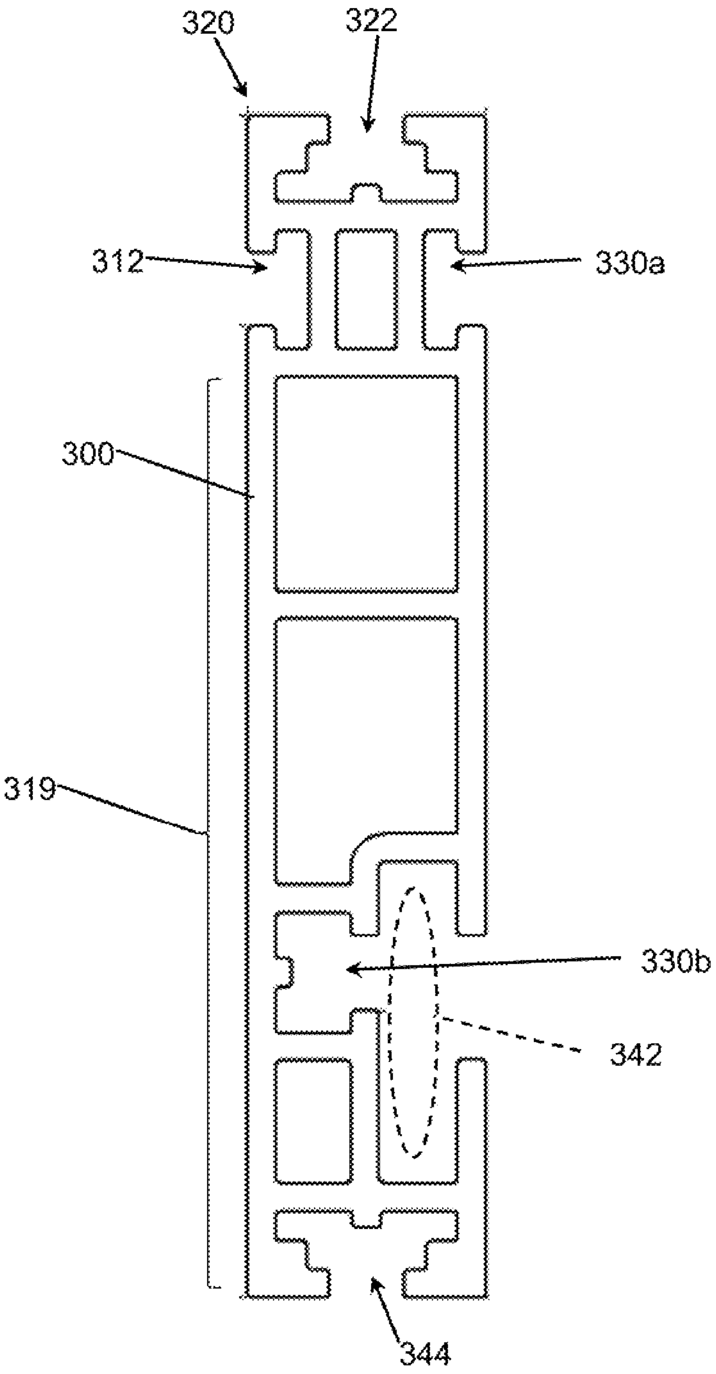
FIG. 8 is a side cross-sectional view of the extended fence member.
Figure 19:
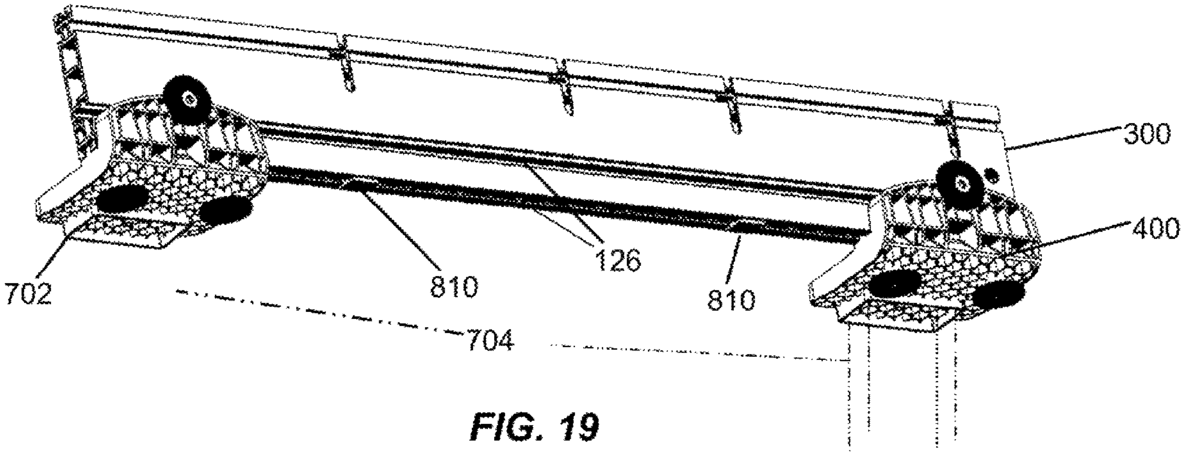
Figure 20:
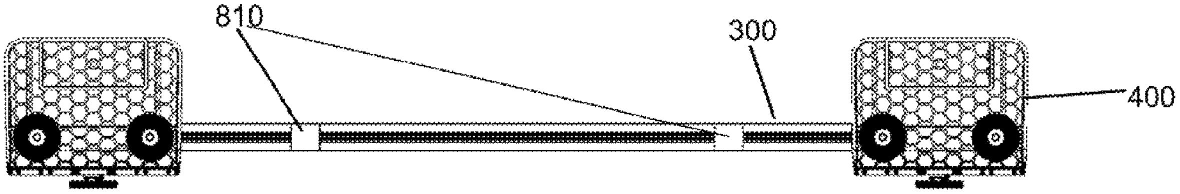
Figure 21:
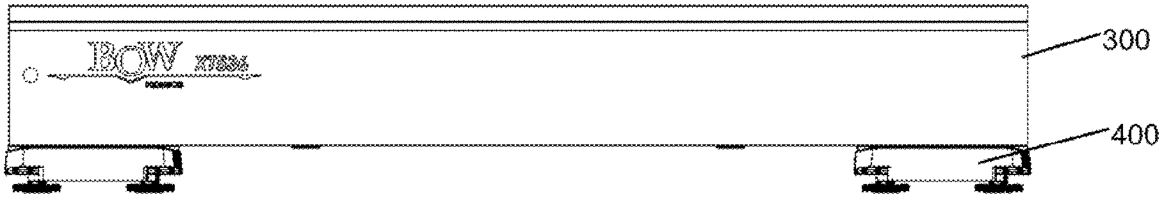
Figure 22:
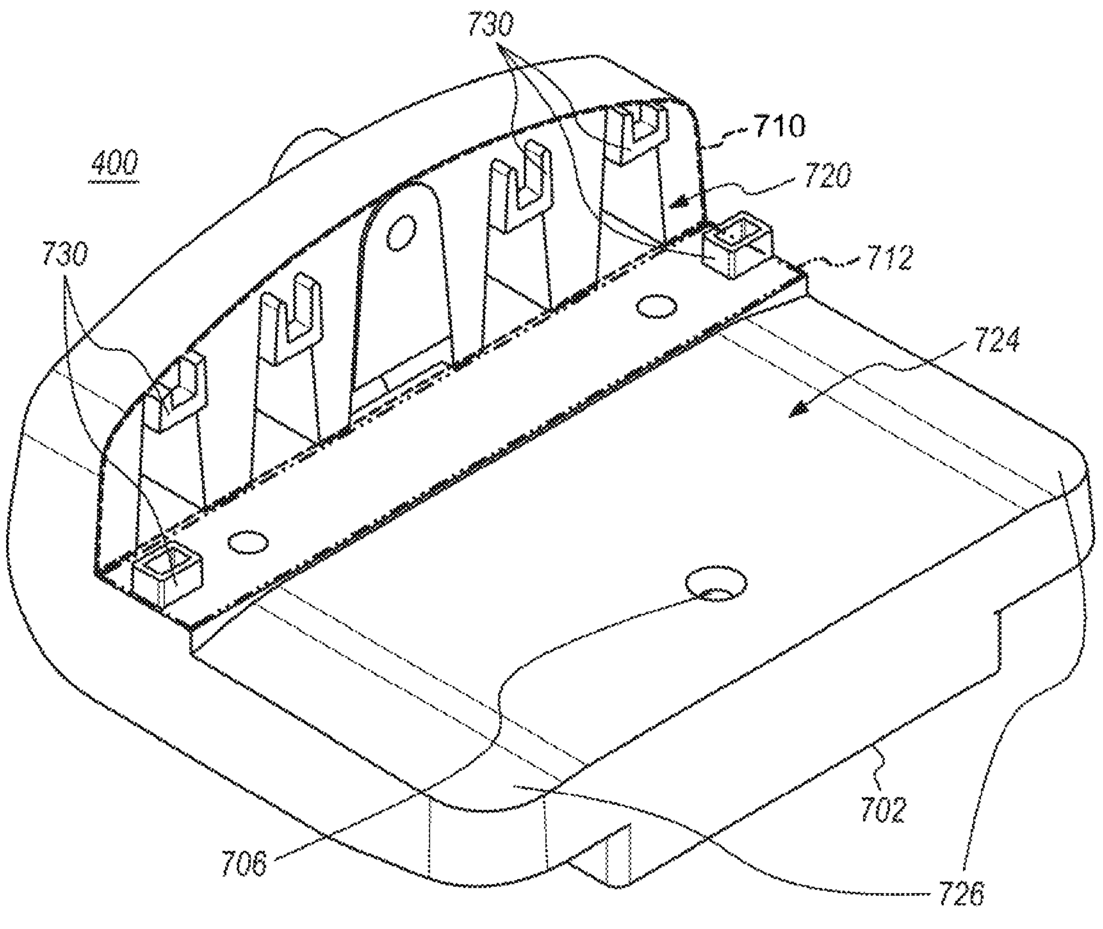
FIGS. 22-25 are detailed illustrations of various views of the feed supports of the embodiment in FIGS. 18-21.
Figure 23:
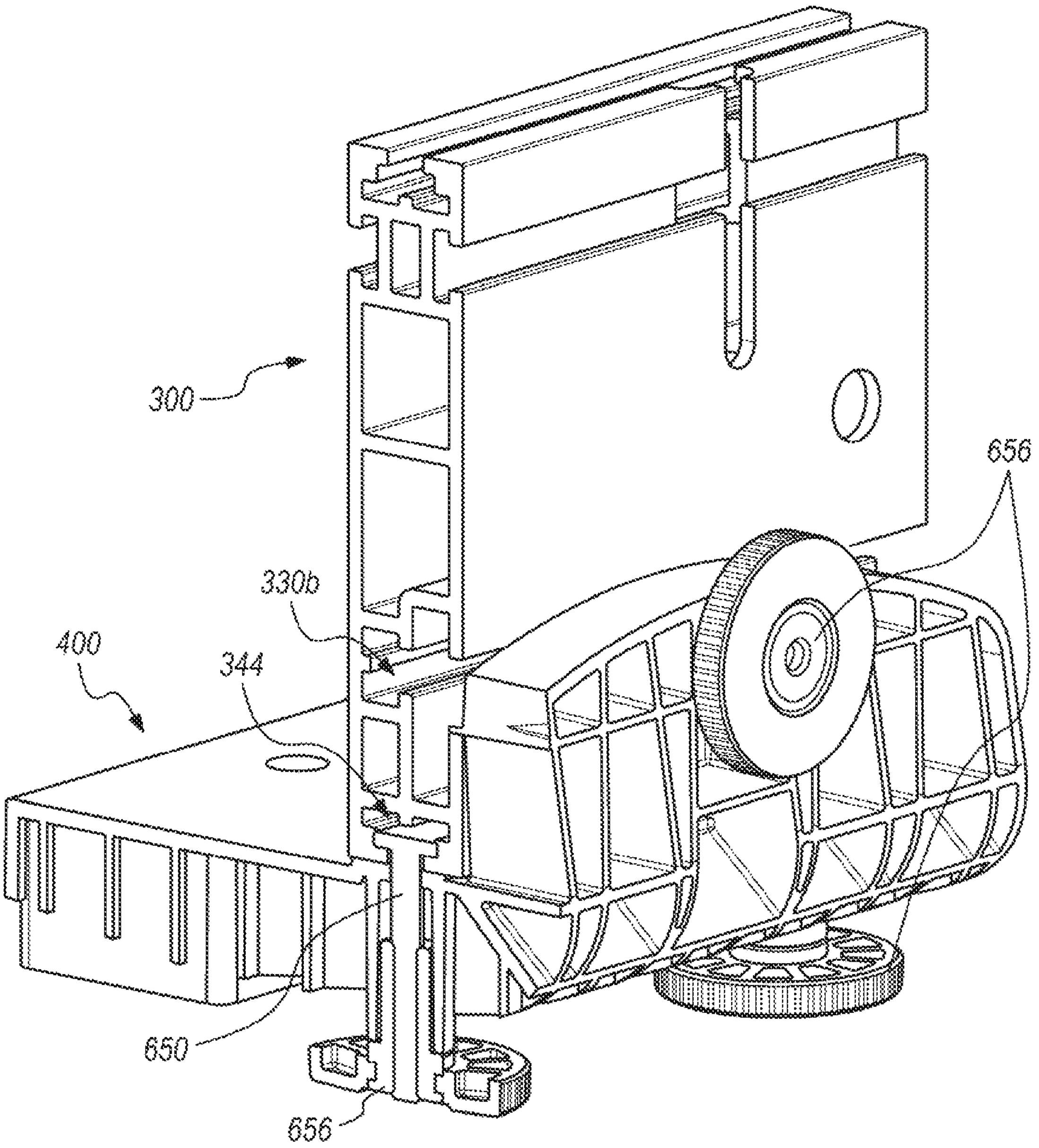
Figure 24:
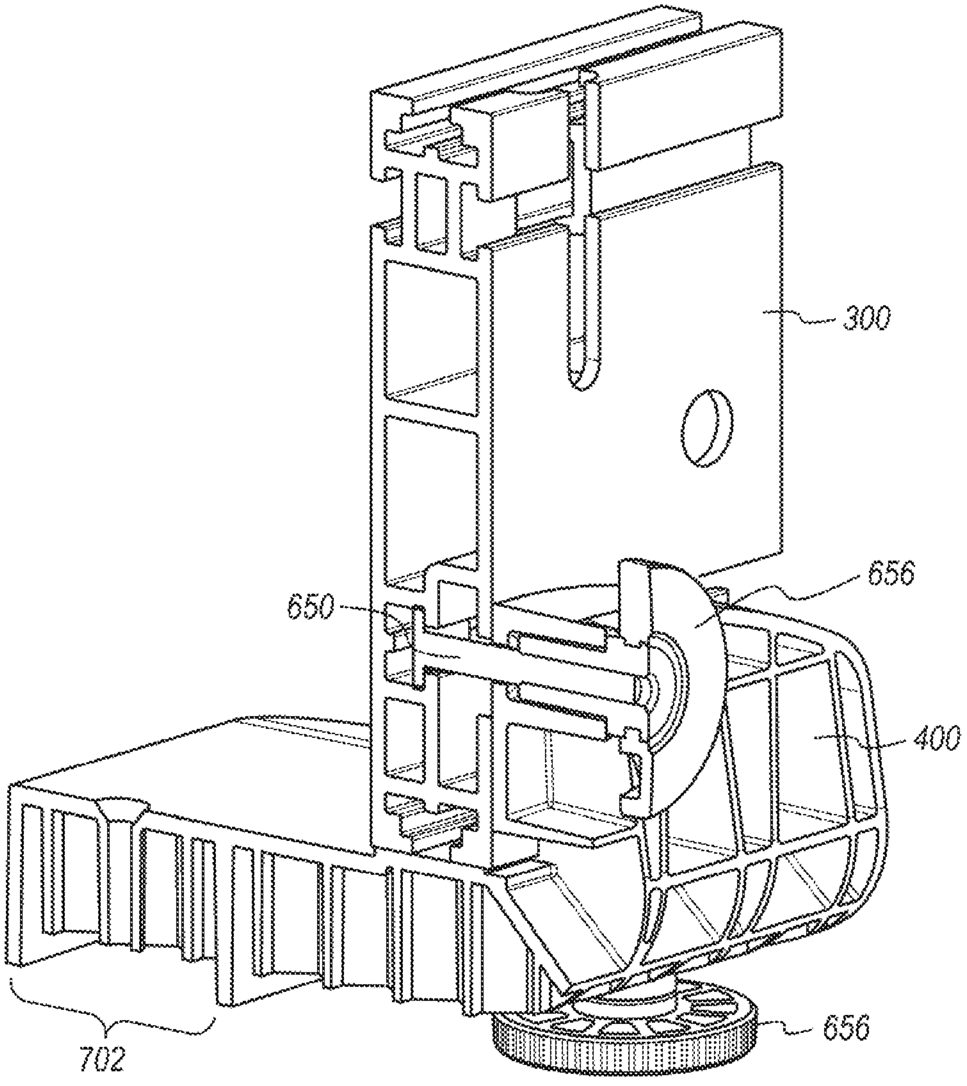

Also referring to FIG. 8, which illustrates a cross section for an embodiment of the extended fence member 300. Extended fence member 330 may be extruded in the shape indicated by the cross-section, providing a generally planar surface or face 310, and a longitudinal T-slot 312 adjacent the top edge 320. The top edge may also have a longitudinal T-slot 322. Longitudinal T-slots 330*a* and 330*b*, on the rear surface of the extended fence member 300 are intended to facilitate attachment of components to the fence member, or to releasably attach the fence member to an existing fence. Furthermore, the enlarged slot, characterized by the dashed line oval 342, is to facilitate attachment of the extended fence member to a Delta UniFence™ or Harvey™ Fence. The lower edge of the extended fence 300 may also include a T-slot 344, which as described below, is suitable for attachment of work supports or other components. Lastly, as illustrated in FIGS. 19-21 for example, the lower edge T-slot 344 also facilitates the attachment of one or more standoffs or slides 810 on the bottom edge of the extended fence member 300.

Figure 10:
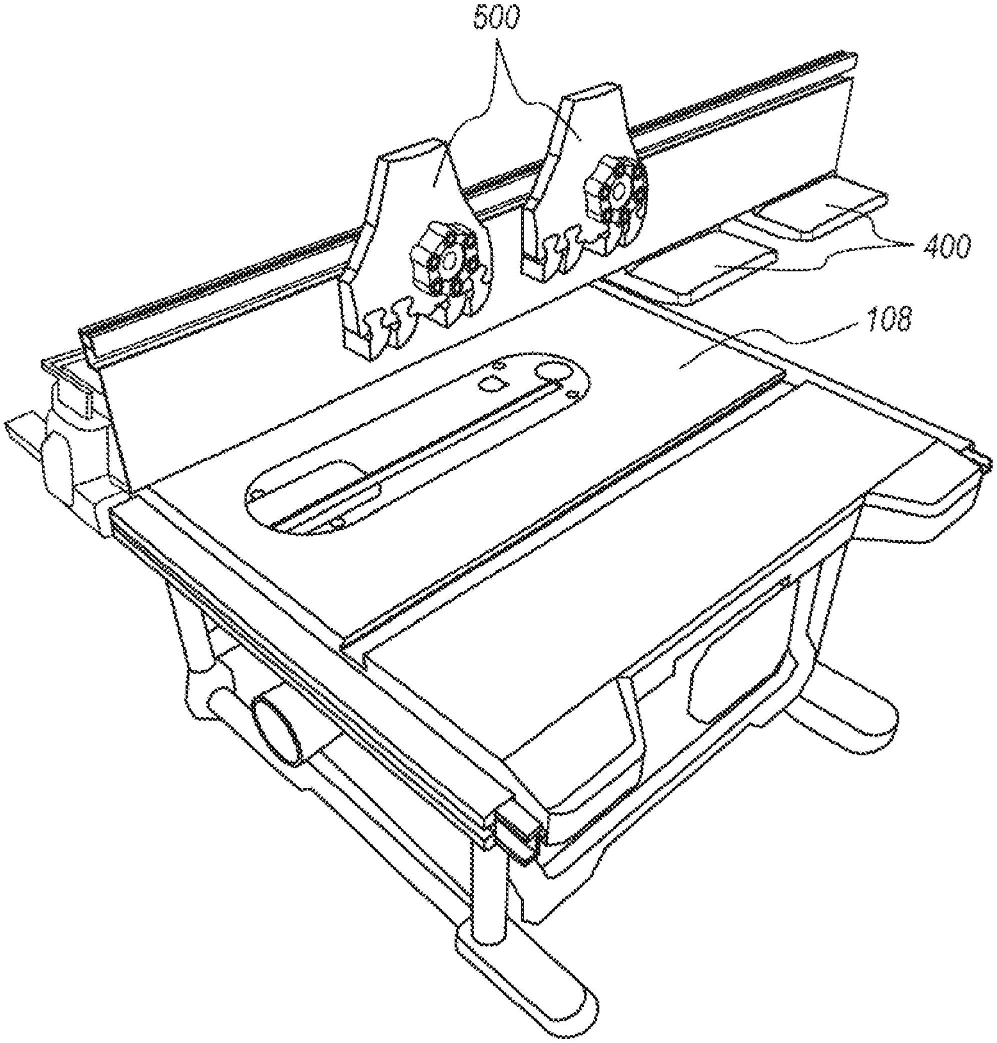
Figure 11:
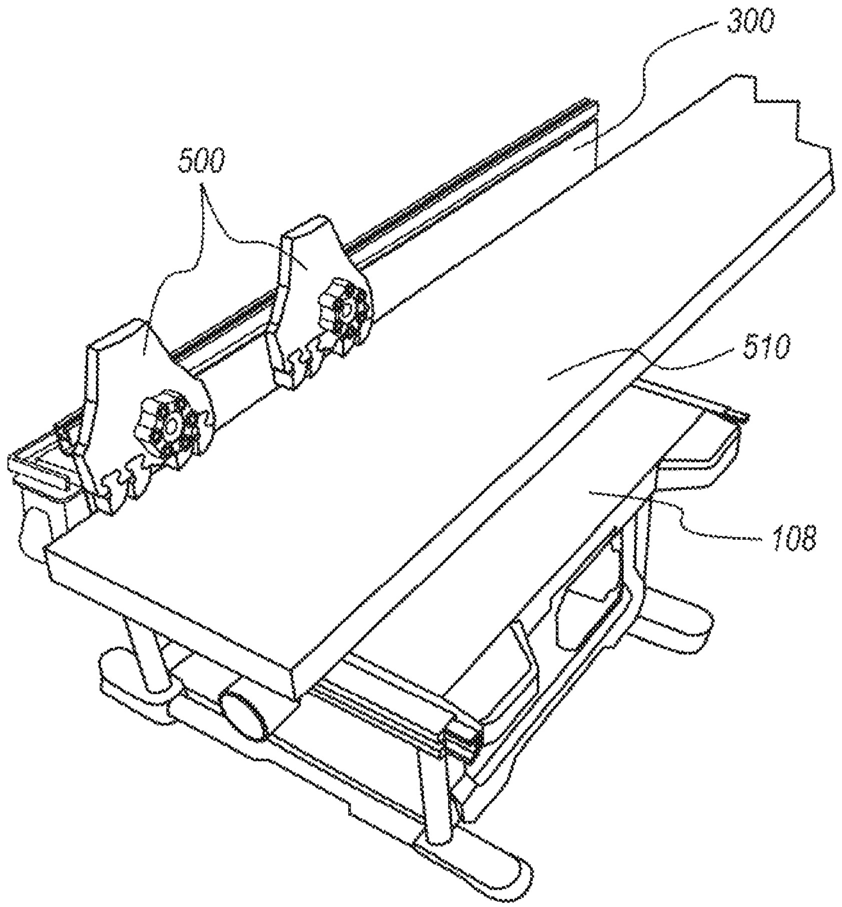

As illustrated, infeed/outfeed feed supports 400 may be added to either or both ends of the extended fence 300 to provide an "extension" of the work table and to help support a workpiece as shown in FIGS. 10-11. The injection-molded polymeric supports are generally L-shaped, with a series of perpendicular ridges 406 along the back side and bottom to provide structural support to the generally planar inner vertical and horizontal faces which form a perpendicular angle between them. The feed support 400 adjustably attaches to the fence (e.g., 300) so that both the vertical face 410 of the support contacts the back side of the fence and the horizontal face 414 of the support contacts the fence bottom, where the support includes a plurality of T-slot fasteners 420 that can be inserted into the T-slots 330*b* and 344 on the fence and tightened by knobs 424, so that the supports 400 may be positioned along or removed from the fence (e.g., fences 110 and 300). In an operating position, the horizontal face 414 of the feed support 400 is flush with the bottom of the fence and provides a surface that extends the fence bottom to support a workpiece beyond the saw table and makes it easier to control a long workpiece.

Molded from a low-friction material such as a plastic or metal, the edges of the feed support's horizontal surface are slightly tapered downward or away from horizontal to provide a transition for workpieces sliding along the support while being cut or shaped.

Another feature of the feed support 400 is that the bottom and/or back of each feed support 400 may further include a recess 702 or connection member, square or round, to receive the top of a support leg 704 that extends down from the support 400 to contact the ground or surface on which the saw is placed. Moreover, the leg 702 may be adjustable relative to the support 400, and may be telescopically adjustable to permit adjustment of the leg to various lengths. In use, the leg 702 may be used to provide additional support for the work support 400, and the workpiece resting thereon, in order to avoid tipping of the table and workpiece.

Figure 9:
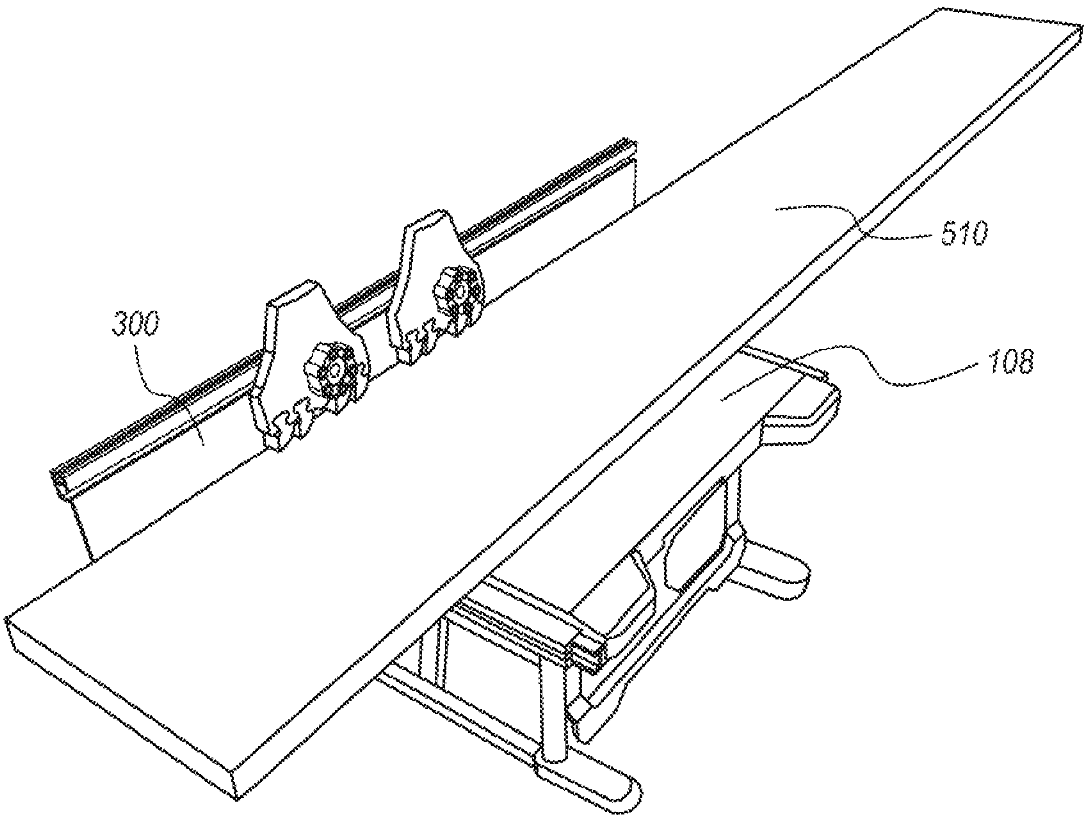
FIGS. 9-12 are representative illustrations of the extended fence in use in association with a portable, contractor-style table saw.
Figure 12:
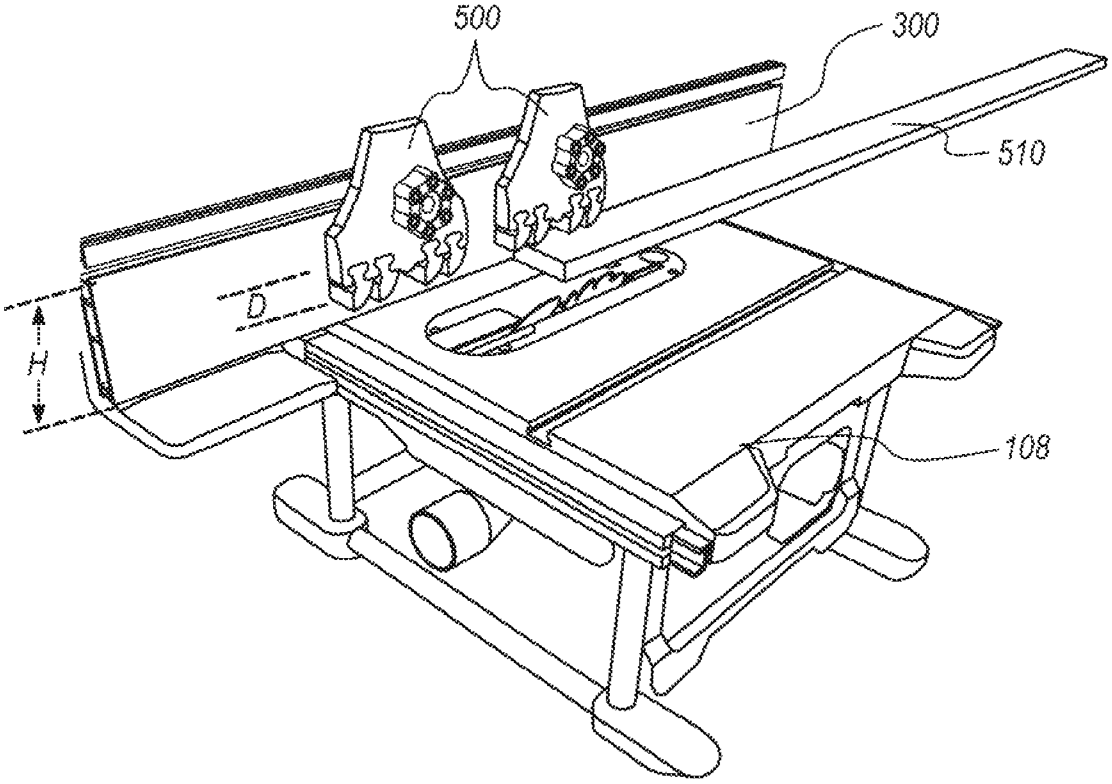

Further considering FIGS. 9-11, embodiments of a tall or vertically extended fence are depicted. In particular, in FIG. 1 the fence 300 is attached to an existing table saw fence in the manner previously described. Fence 300 has a planar lower portion on the front face and the T-slots along the top of the face and the top of the fence as well. As previously noted, and illustrated in FIGS. 10-11, a hold-down device(s) 500 such as a FeatherPro™ (from Bow Products) may be attached on the face of the tall fence 300, using the T-slot 312, in order to provide a force to keep the workpiece 510 on the table and resisting reversal of the workpiece while sawing. As illustrated in FIG. 12, a height (H) of the at least one T-slot 312 on the second surface of the extended fence 300 is greater than a minimum operable distance (D) of a featherboard 500 attached to the extended fence using the at least one T-slot in order to assure that the hold-down device such as a featherboard can be used on the fence.

As illustrated in FIG. 12, fence 300 further includes a pair of infeed/outfeed supports 400 to provide support for a workpiece 510 as it is being pushed along the fence, both prior to and during the cutting process. From FIG. 12, it is clear that the hold-down devices and infeed/outfeed supports 400, in combination, are able to support a workpiece extending well beyond the table surface. Of course, a user must exercise caution and should not attempt to saw a workpiece without having control, but the figure is provided to illustrate the improved functionality achieved with the disclosed embodiments.

Turning next to FIGS. 13-17, depicted therein are alternative embodiments for the extension fence 300. In the alternative embodiments, the method of attachment is changed on the straight fence 300, in order to provide other attachment options for attaching the straight fence to a contractor saw or larger cabinet saws, and so that attachment choices are available to the user.

Figure 13:
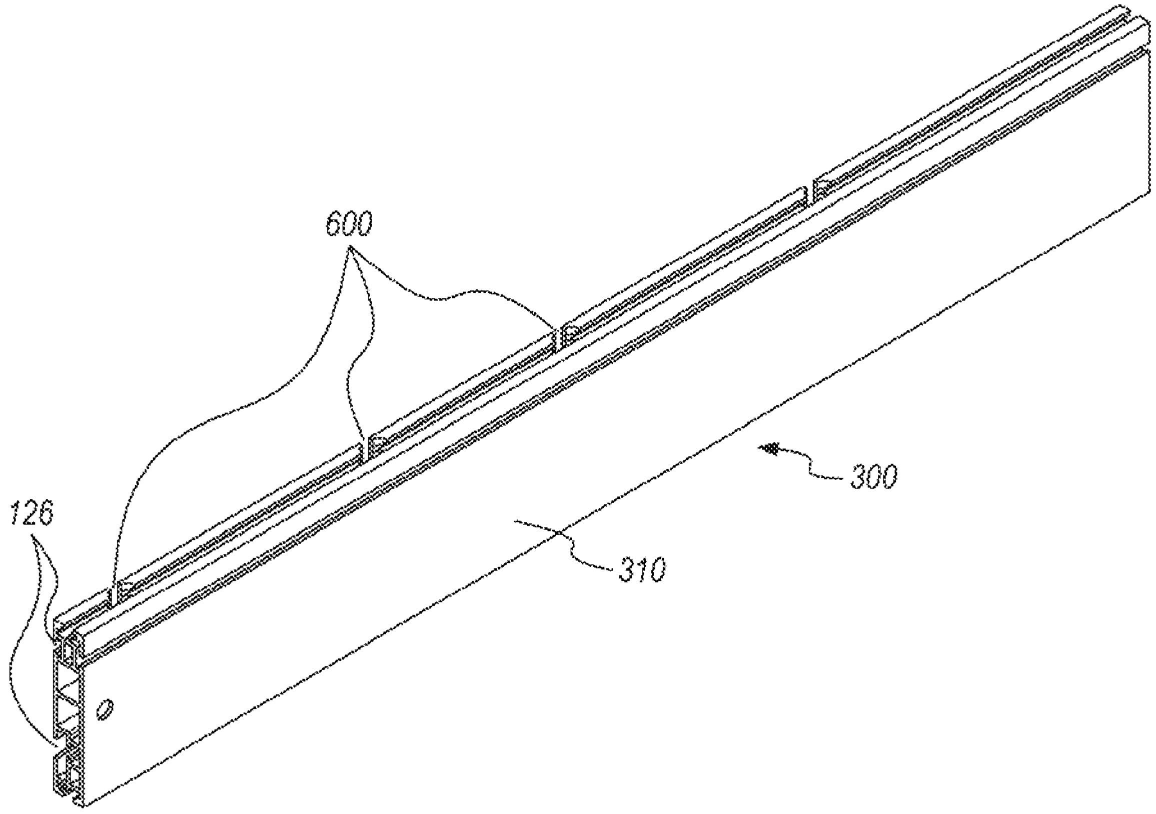
FIGS. 13-17 are illustrations of the extended fence with vertical slots to permit attachment to a fence using clamps.

Illustrated in FIG. 13 is a perspective view of extended fence 300 with face 310, where the bottom and lower back side includes various channels 126 that facilitate the insertion of a T-bolt (not shown) or similar attachment mechanism to facilitate the semi-permanent, "bolt on" attachment of the fence 300 to an existing fence's face. In such an embodiment, T-bolts may be inserted within channels 126 on the back of the fence 300 and then passed through corresponding holes or slots in the existing fence, and tightened using a nut and lock washer combination, or possibly a knob such as used for attaching the feed supports 400.

Figure 3:
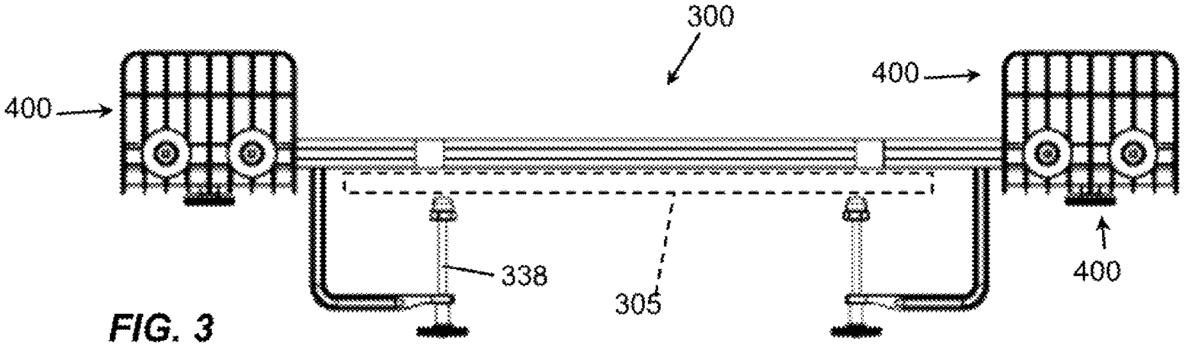
Figure 4:
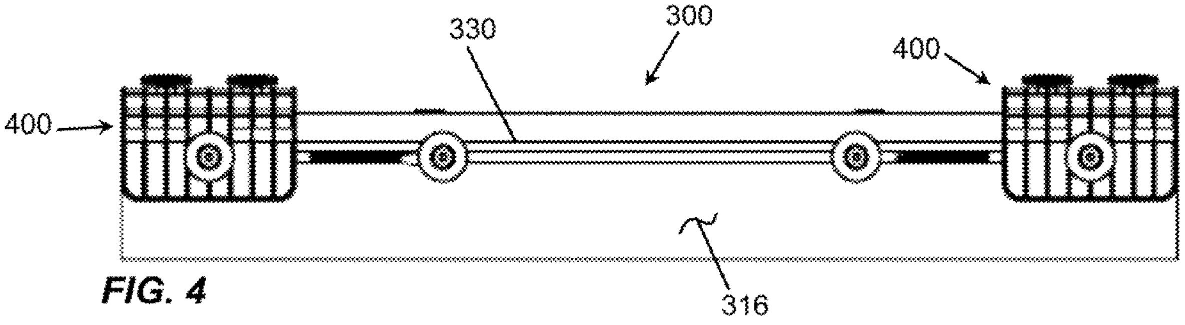
Figure 5:
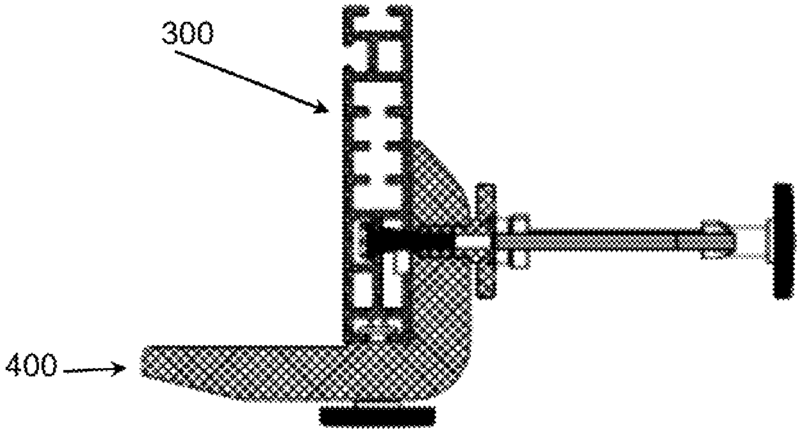
FIG. 5 is a side cross-sectional view of the extended fence and feed support.
Figure 6:
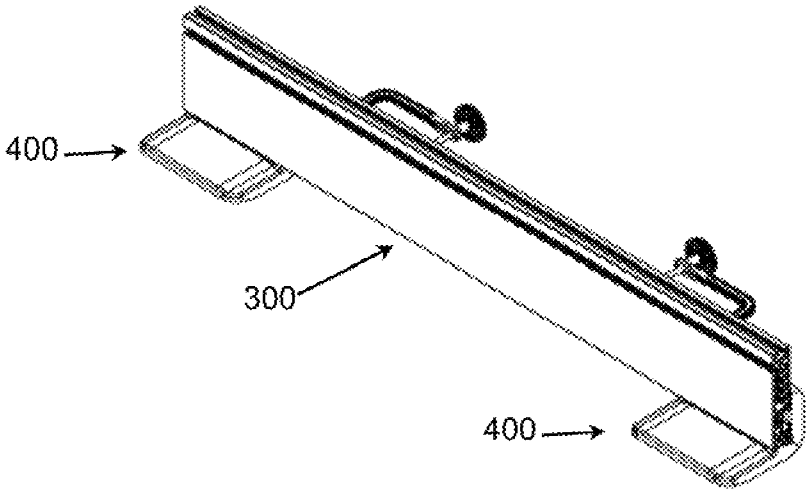
FIGS. 6-7 are front and rear perspective views of the extended fence and feed supports.
Figure 7:
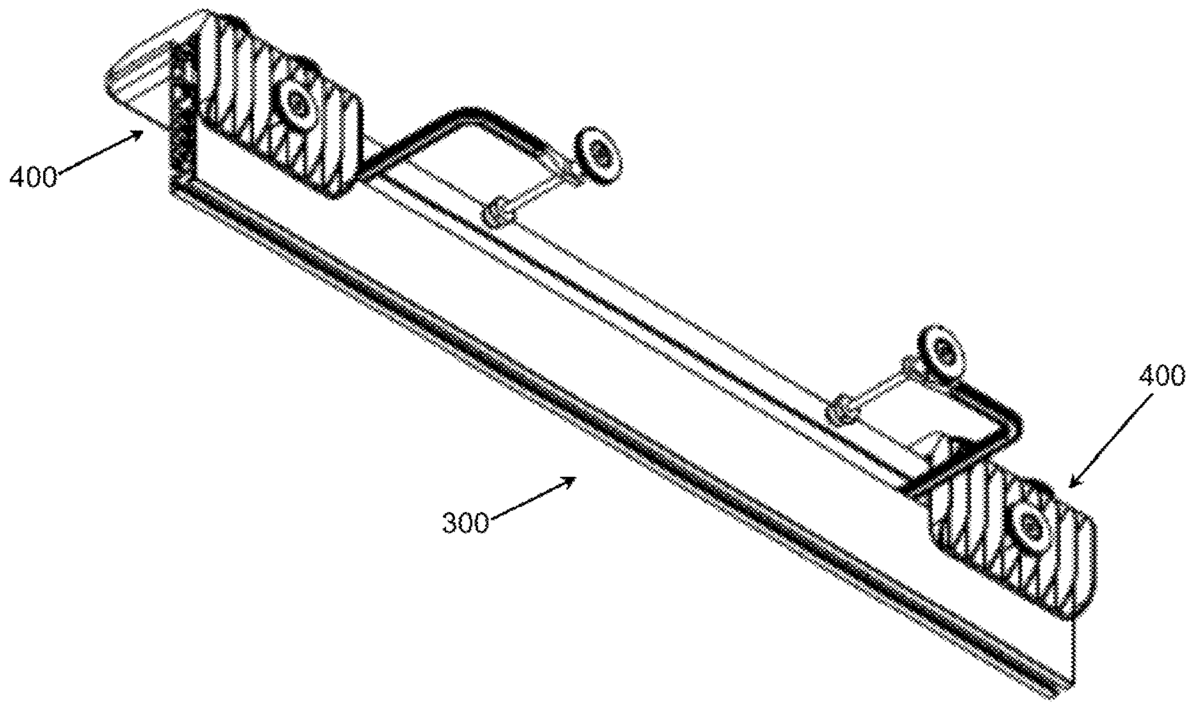
Figure 14:
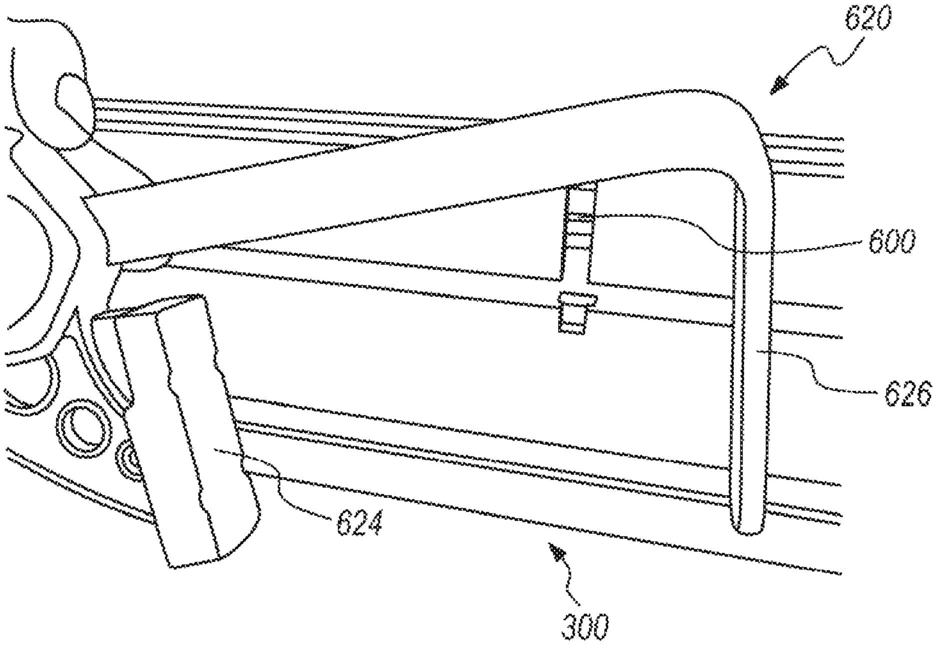
Figure 15:
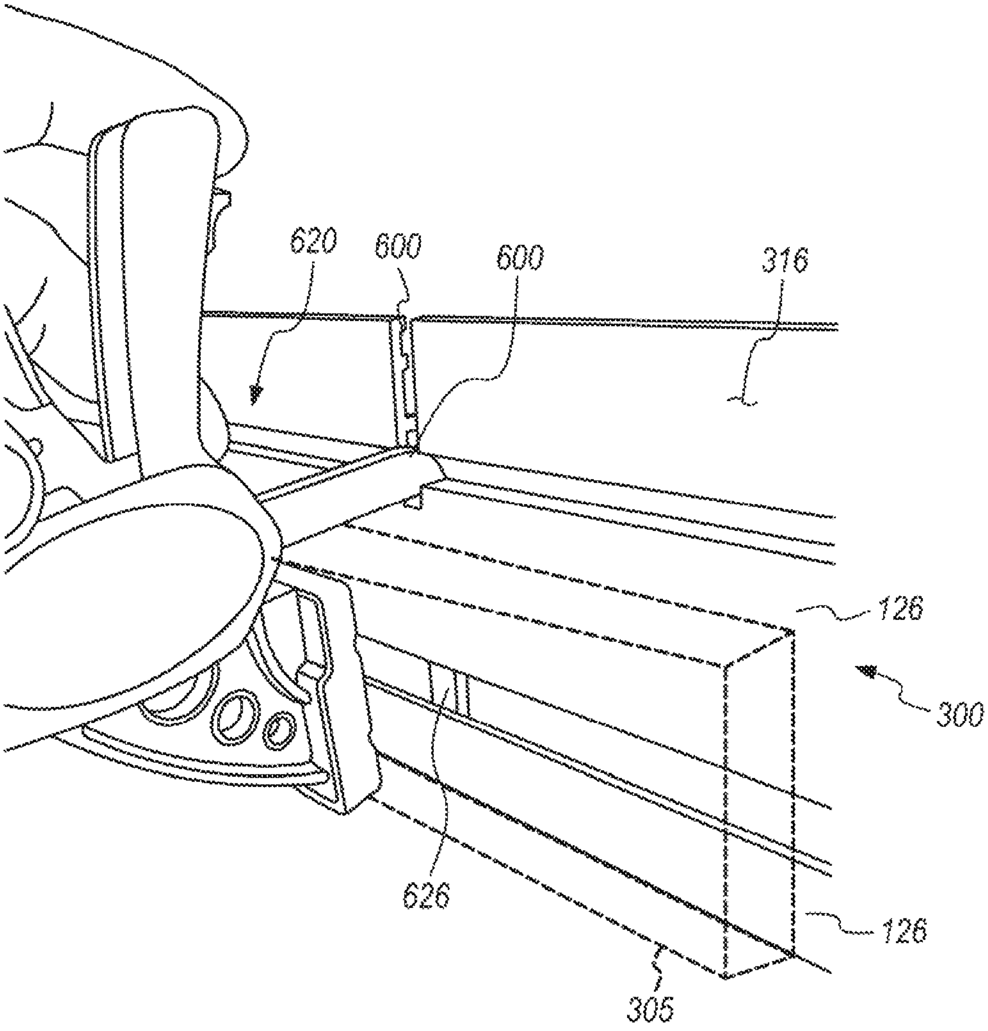
Figure 16:
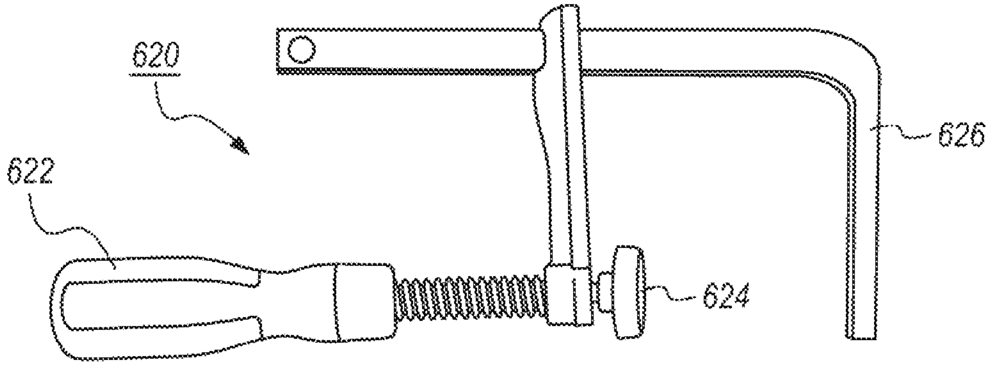
Figure 17:
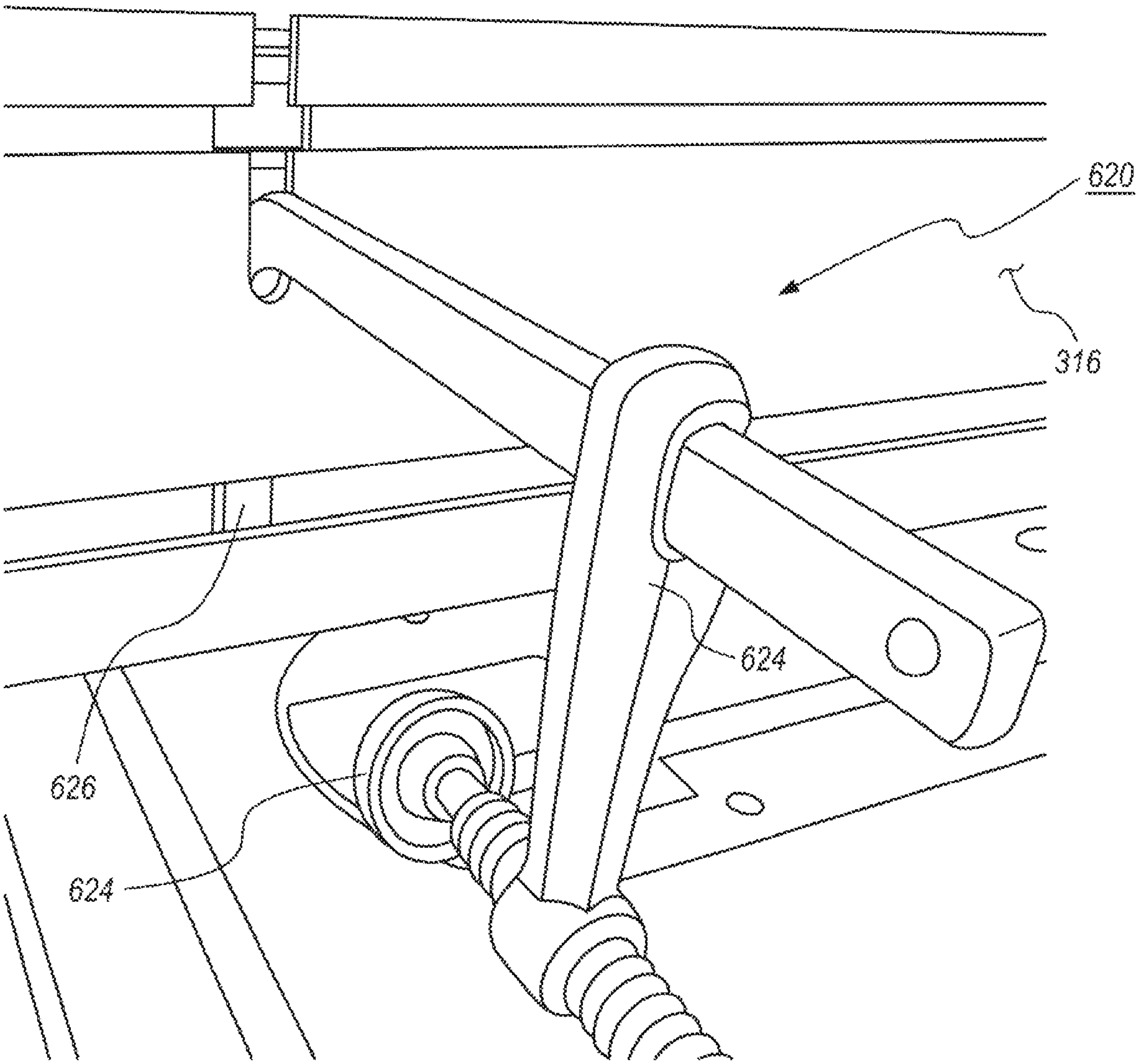

As further illustrated in the alternative embodiment of FIGS. 13-19, the fence 300 may also include partial vertical slots 600 in the rear to accommodate standard industry-available T-track clamps 620 (e.g., PIHER® Quick T-track), so that the fence is easily attached to and detached from the existing fence 305 (shown in dashed line format). FIGS. 14 and 15 illustrate two alternative types of clamps 620, including the quick clamp of FIGS. 13-14, as previously described, and the screw-type clamp of FIG. 15, which uses rotation of the clamp handle 622 to tighten/loosen the clamp head 624 relative to the end of the L-shaped arm 626. It will be appreciated that a T-track clamp 620 may be used vertically, as shown, or horizontally if inserted from the end of the fence extrusion as illustrated in FIG. 3, for example.

Referring next to FIGS. 18-21, depicted therein are various illustrations of another configuration of the extended fence 300. The fence 300 of FIGS. 18-21 includes vertical clamp-type mounting slots 600, and includes feed supports 400 attached on the ends of the fence. It will be appreciated that one or more feed supports 400 may be employed with a fence 300, and that the position of the supports may be adjusted in accordance with the position of the extended fence relative to the worktable. For example, while depicted with a support on each end, it is also contemplated, as shown in the example of FIG. 10, that multiple supports may be placed on one side of the saw table.

Also considering FIGS. 22-25, depicted therein are various detailed views of the feed support 400, which may be attached to and used with fence 300, such as illustrated in FIGS. 18-21. As seen in the figures, the feed support 400 is designed to mate with the bottom and rear surface of the fence 300, such that portions 710 and 712 of surfaces 720 and 724, respectively, are in contact with the channels, and where the remaining, generally horizontal surface 724, with tapered edges 726, extends beyond the face of the fence to provide support for a workpiece beyond the edge of the saw table. Extending from the portions 710 and 712 are nubs 730, or similar detent-like features, that self-align and engage with the bottom-facing T-slot 344 and lowermost rear channel **330*b*, to facilitate a sliding fit for the feed support 400 to the fence 300. As will be appreciated one or more T-bolts 650 or similar fasteners, in combination with a tightening mechanism such as an internally-threaded knob 656 or cam (not shown) may be employed to tighten the T-bolt relative to the channels and the extender and retain the feed support 400 in a desired position along the bottom of the fence 300**.

Figure 18:
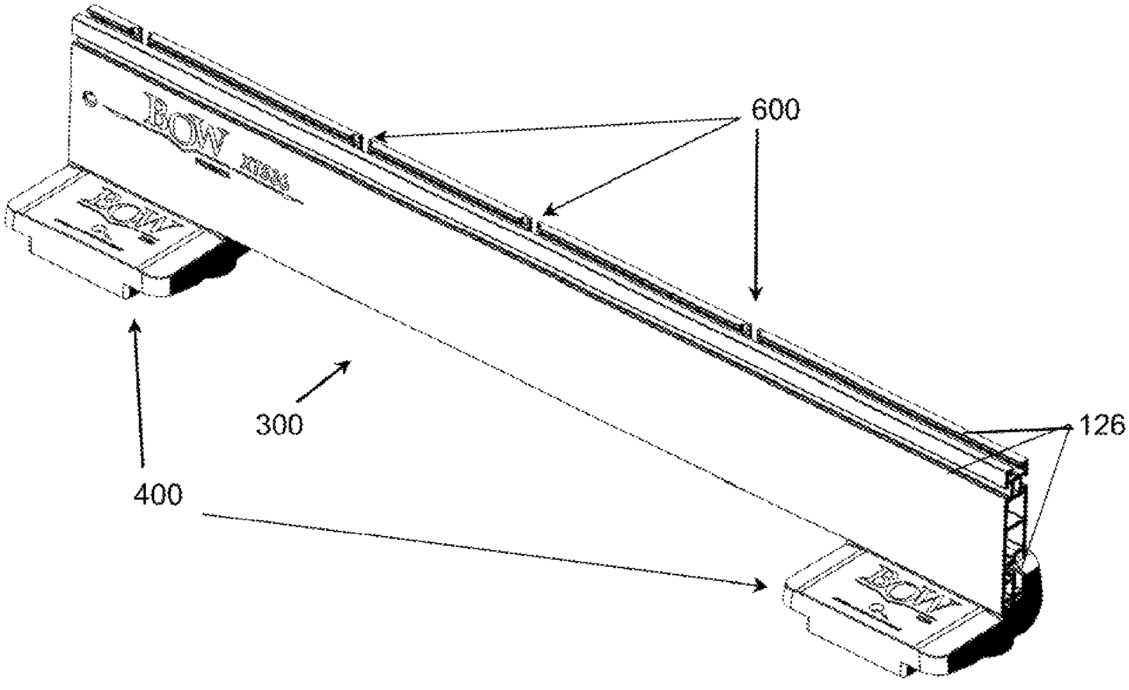
FIGS. 18-21 are illustrative examples of an embodiment of the extension fence with associated feed supports attached thereto.
Figure 25:
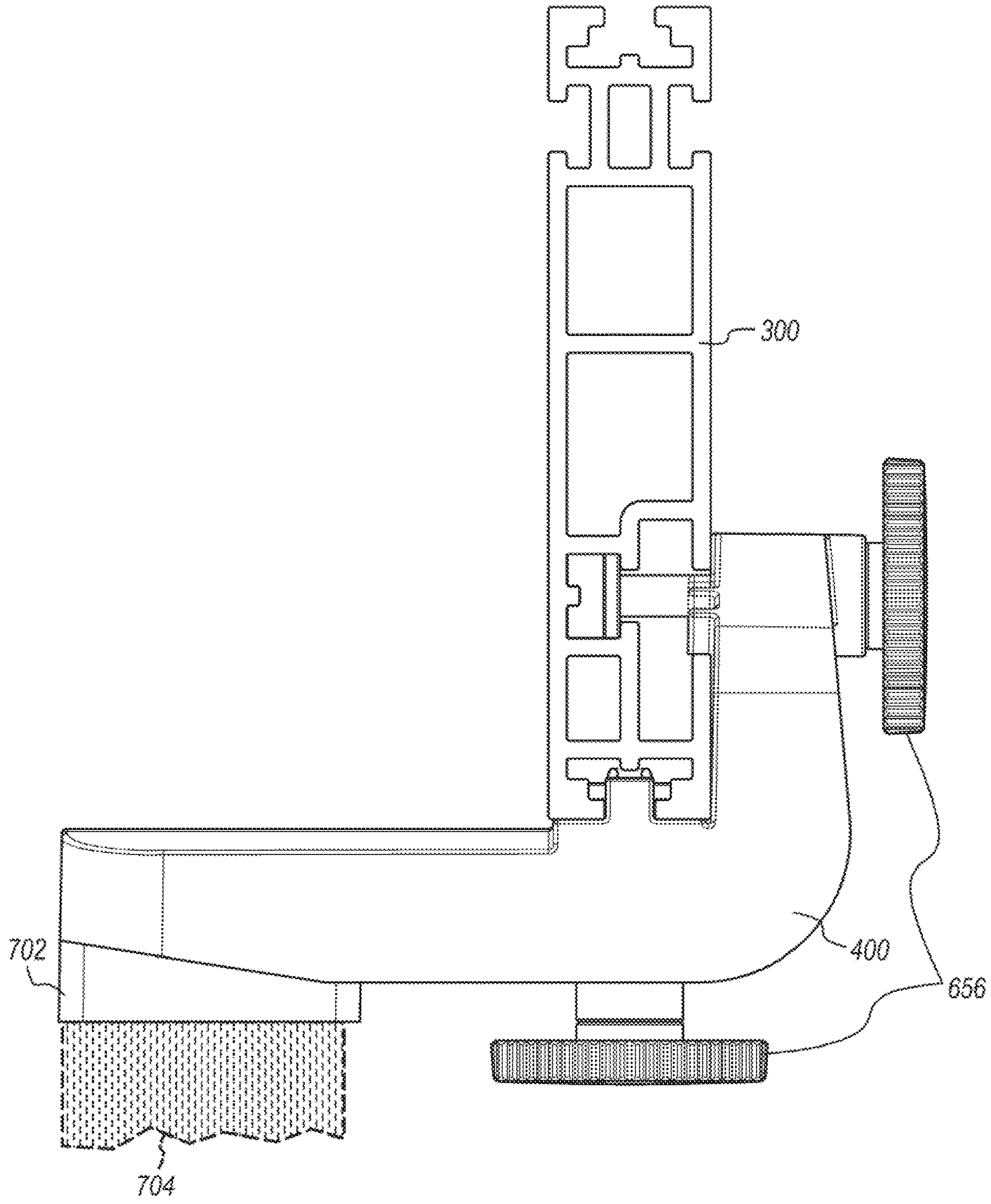
Figure 27:
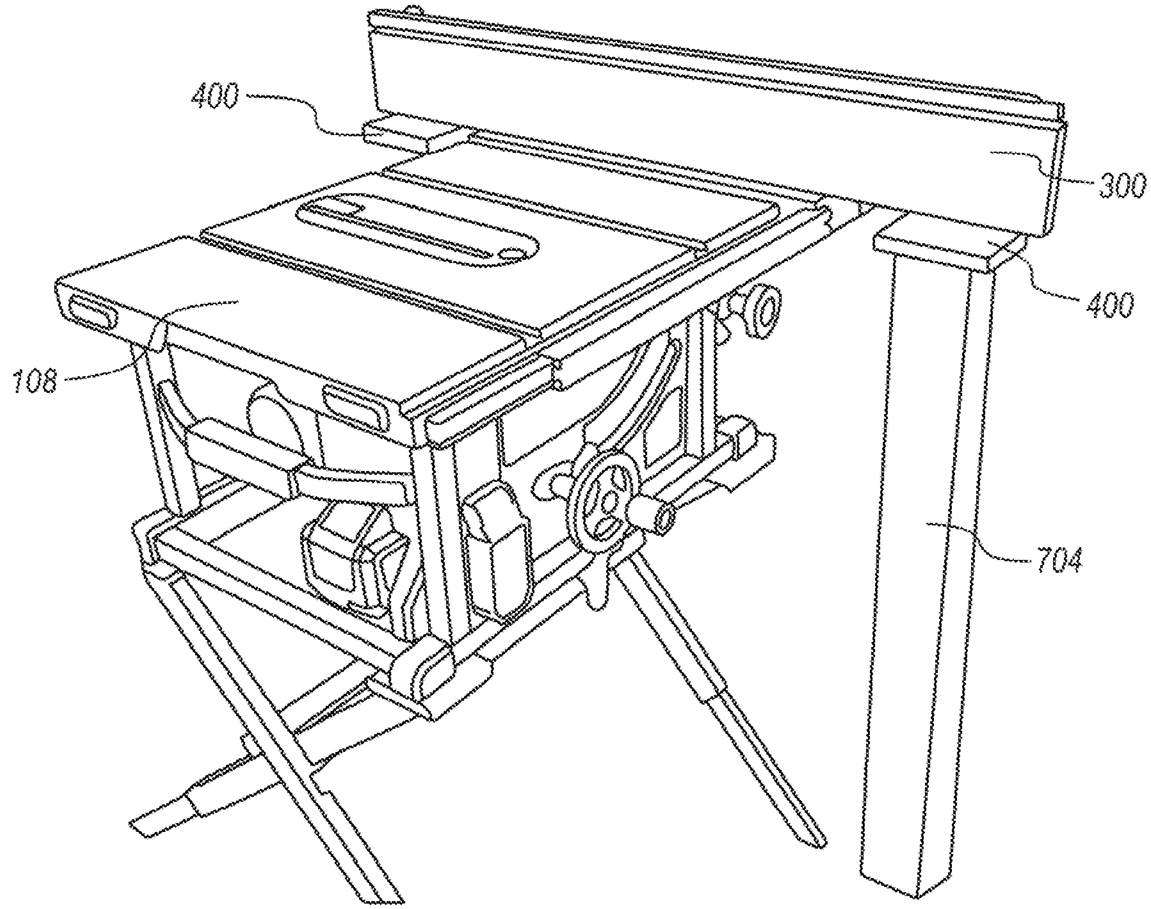
FIG. 27 is an illustration of a fence and feed supports attached to a portable table saw in accordance with a disclosed embodiment also including a support leg.

As illustrated in FIGS. 18, 25 and 27, the feed supports 400 further include a recessed pocket 702, which may be molded into the bottom thereof, suitable for receiving the end of a standard lumber piece (e.g. 2 in.×4 in. or 35 mm×90 mm), which can be further retained using a wood or drywall screw inserted through hole 706 into the lumber piece, so that the feed support may have a support leg 704 spanning between the bottom of the feed support 400 and the floor or ground. A support leg 704 of a proper length will reduce or eliminate the likelihood of a workpiece resting on the table 108 and the feed support 400 causing the saw to become unstable or tip.

Figure 26:
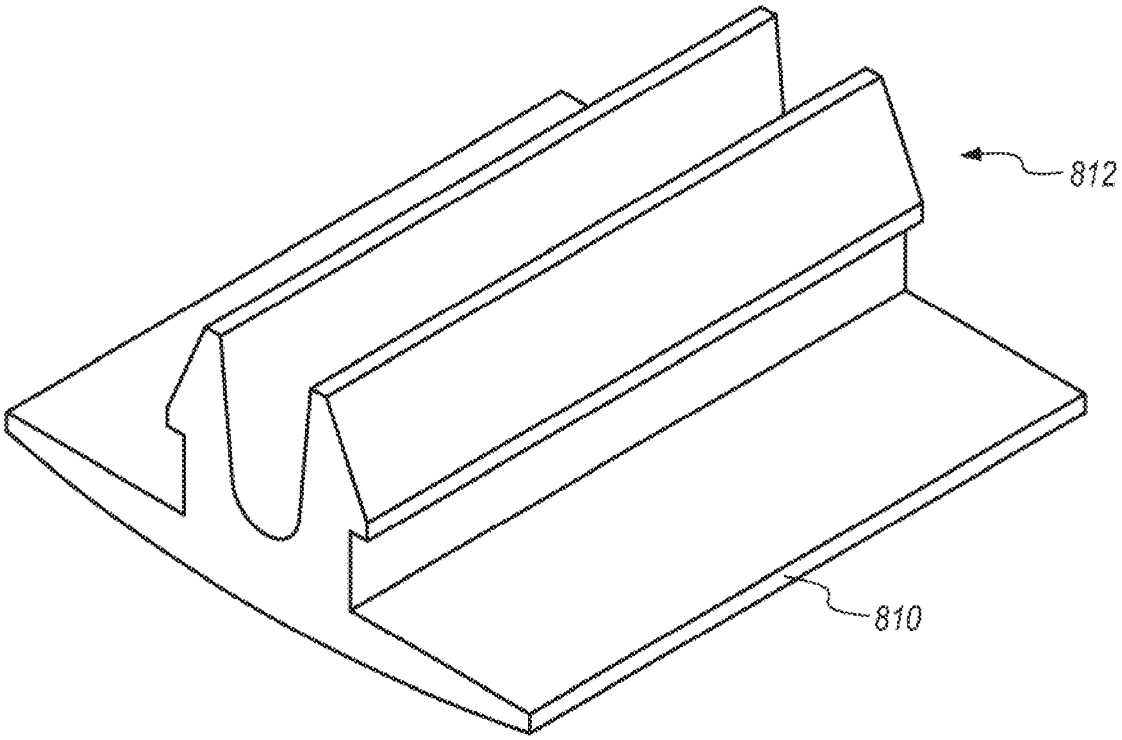
FIG. 26 is a perspective view of a plastic standoff mountable within a T-slot of the extended fence to provide a glide surface and appropriate spacing between the fence and the work table.

Lastly, turning to FIG. 26, depicted therein is a perspective view of a plastic standoff 810, the tabs 812 of which are inserted into the T-slot on the underside of the fence 300 as illustrated in FIG. 20, and the tab shoulders help retain the standoff in position. The standoffs 810 serve at least two purposes, one is to act as a glide when the fence position, relative to the blade, is adjusted by sliding the fence over the table. The other purpose is as a reference when mounting the fence. When mounting extension fence 300 to an existing fence the user can set the standoffs of the extension fence directly onto the table surface and clamp or bolt the auxiliary fence in place. The standoff is of a thickness, at its middle below the extension fence 300, that will appropriately index the extension fence 300 so that the feed supports 400 are in the same horizontal plane as the table surface.

In another embodiment, fence 300 may have an extension arm(s) that extends the length of the fence for use of a further feed support. Contemplated is the use of a sliding or pivoting extension wherein a portion or arm of the fence extends beyond the end of the fence 300 to provide a further support for a workpiece.

In the various fence embodiments disclosed, the fence may be produced via extrusion of aluminum or an alloy thereof, and the fence may be anodized or powder-coated to assure a hardened, wear-resistant surface. The tracks or T-slots are similarly anodized or coated to increases the wear resistance of such surfaces and assure that the fixtures mounted therein may be easily adjusted as necessary and to minimize scratching or other damage to the slots.

Figure 28:
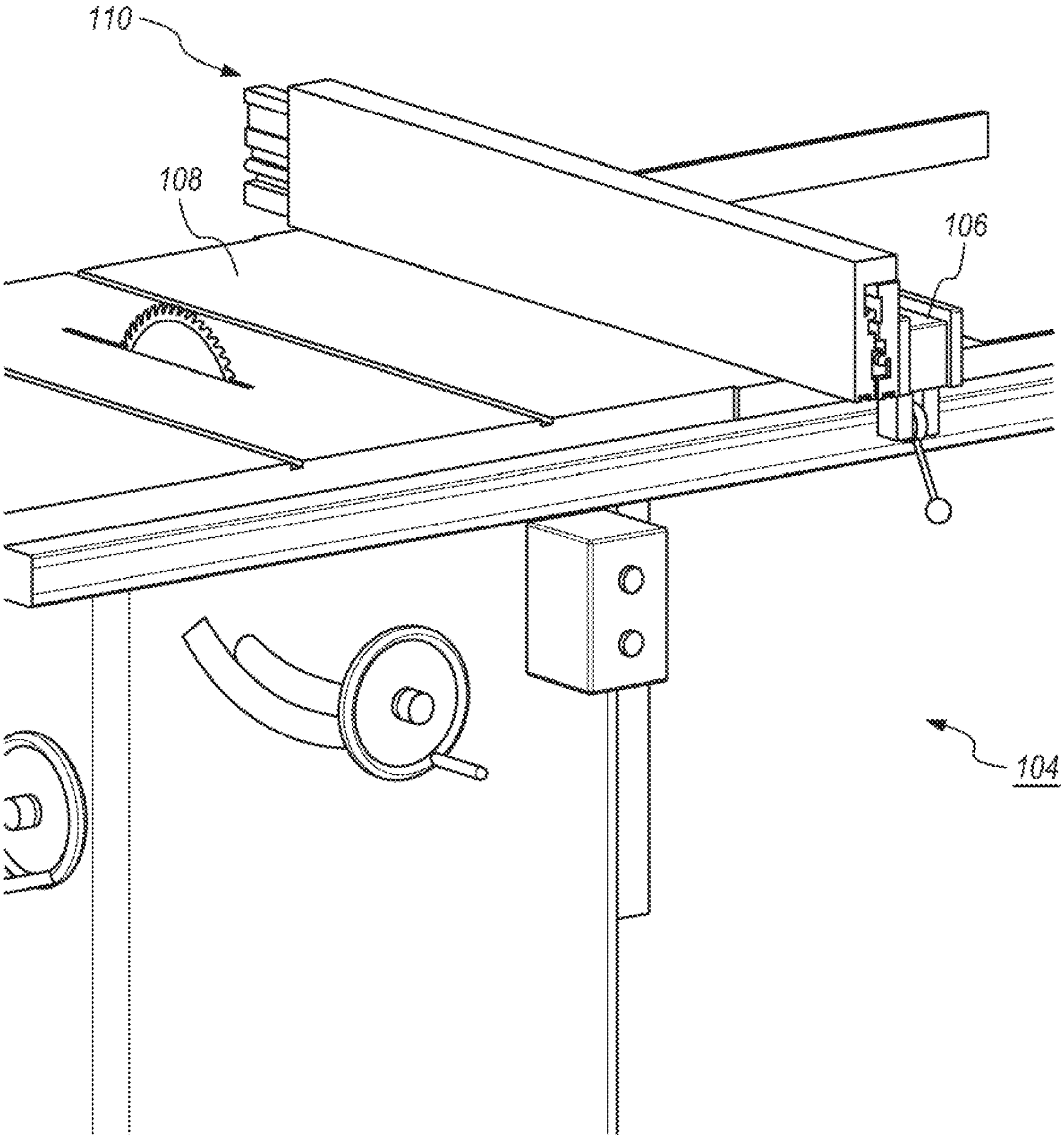
FIG. 28 is an illustration of a table saw with an embodiment of the sliding work fence operatively connected to it.
Figure 34:
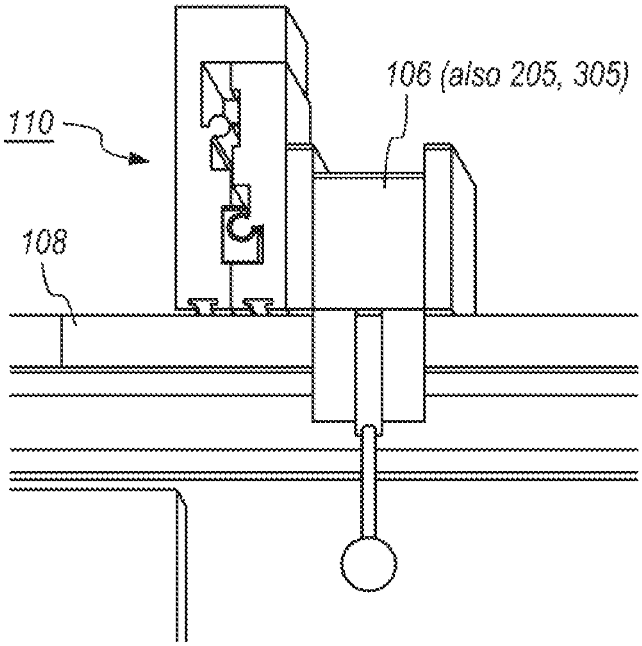
FIG. 34 is an expanded end view of the end of the sliding work fence depicted in FIG. 32.

Referring next to FIGS. 28-36, depicted therein is an alternative embodiment of an extendible or sliding work fence 110 intended for use with table saws 104 and other cutting machines, which may be operatively connected to a table 108 using conventional means, or attached to the face of an existing fence 106 as depicted, for example in FIGS. 28 and 34. In one embodiment, the sliding work fence includes an inner linearly-extruded member 120, for attachment directly to the work table 108 or to a pre-existing work fence 106 on the work table 108 as illustrated. Slidably engaged with the inner member 120 is an outer linearly-extruded member 150. More specifically, the inner and outer members are slidably engaged along a least a first surface

154, with the outer member having a substantially planar second surface 158 for contact with a workpiece (not shown). As will be appreciated from the illustrated embodiments, outer member 150 may slide with a workpiece contacting its second surface 158 as the workpiece is advanced along the work surface or table 108.

It will be appreciated that the sliding work fence may further include a stop mechanism to prevent the over-extension and separation of the outer member 150 from the inner member 120 when sliding relative to one another. Such a feature may be implemented by interfering stops (not shown) operatively affixed to each of the inner and outer members, where the stops engage one another as the outer member is moved to or near a fully extended position.

Figure 36:
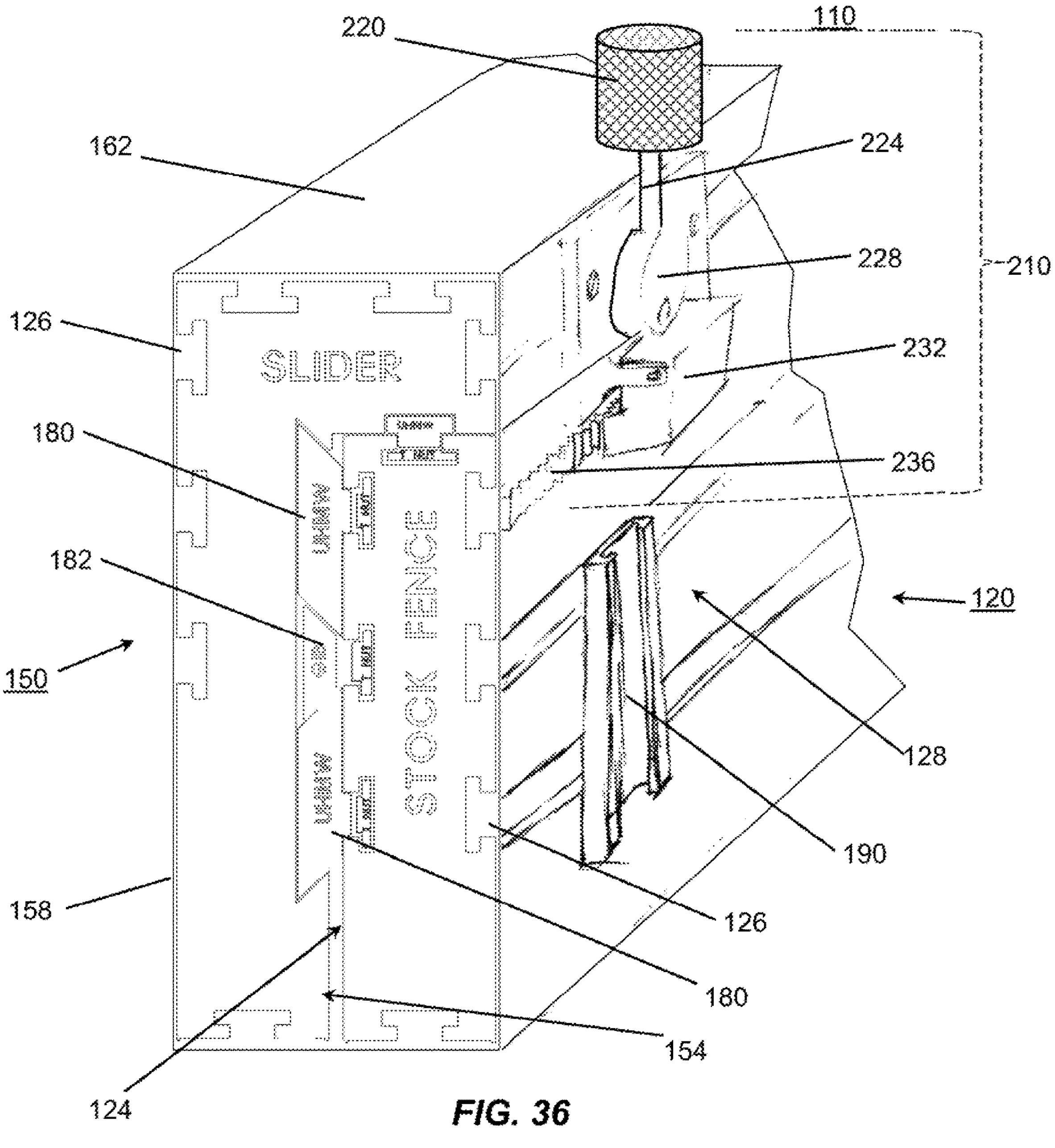
FIG. 36 is a perspective view of an alternative sliding work fence embodiment, further illustrating a locking feature.
Figure 37:
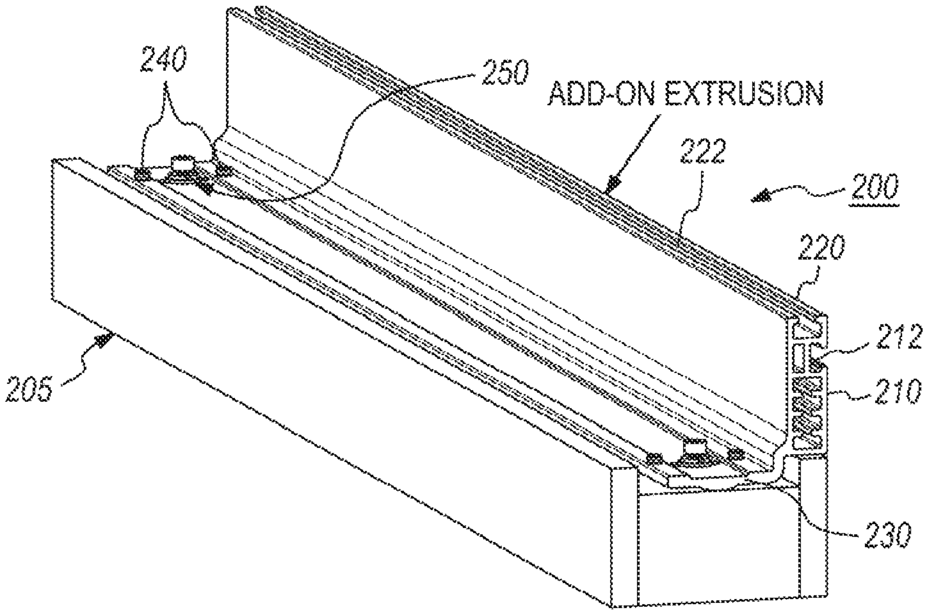
FIG. 37 illustrates an add-on fence configuration suitable for extending the height of a Beisemeyer-type fence.
Figure 38:
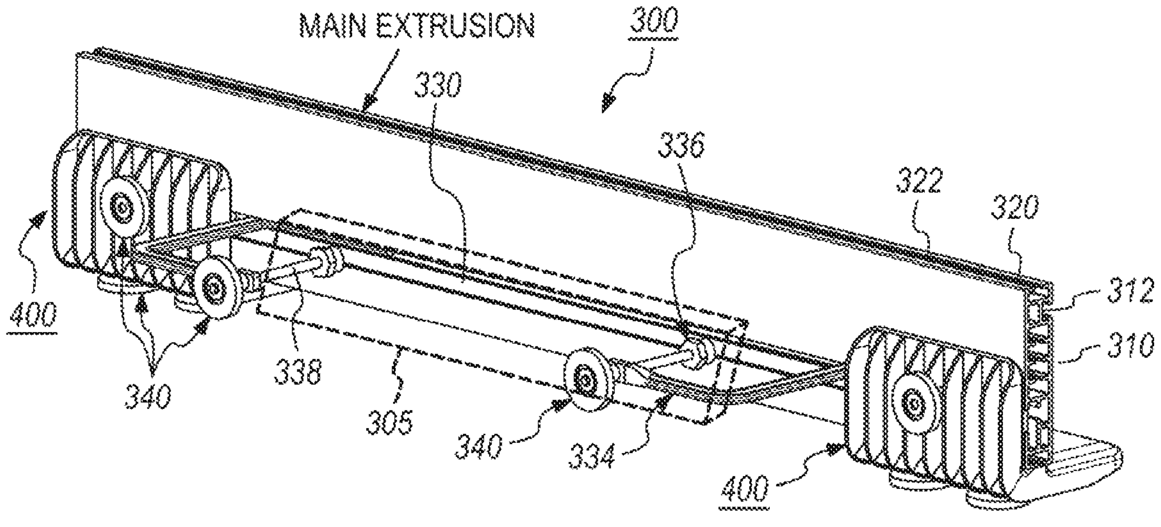
FIG. 38 illustrates an extended fence having one or more feed supports attached.
Figure 39:
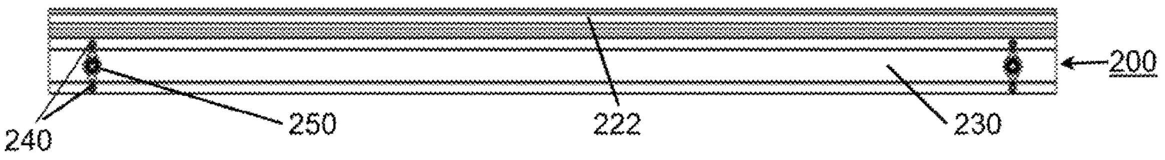
FIGS. 39-45 are various views of a fence extension suitable for use in the configuration of FIG. 37.
Figure 40:
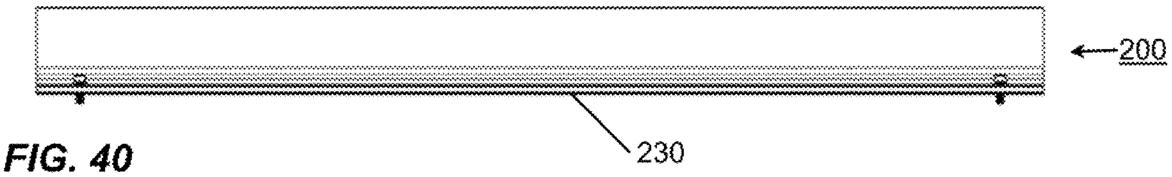
Figure 41:
Figure 42:
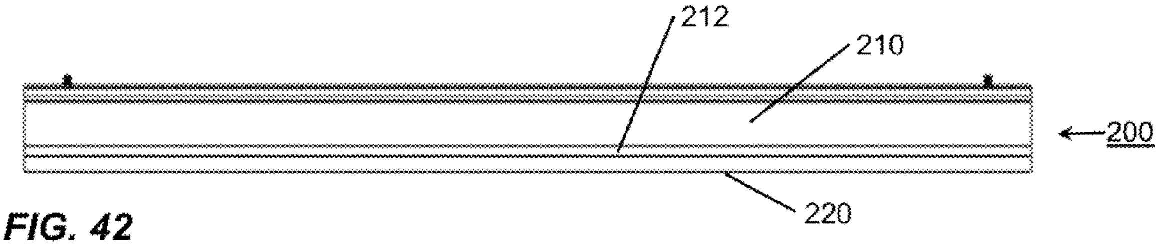
Figure 43:
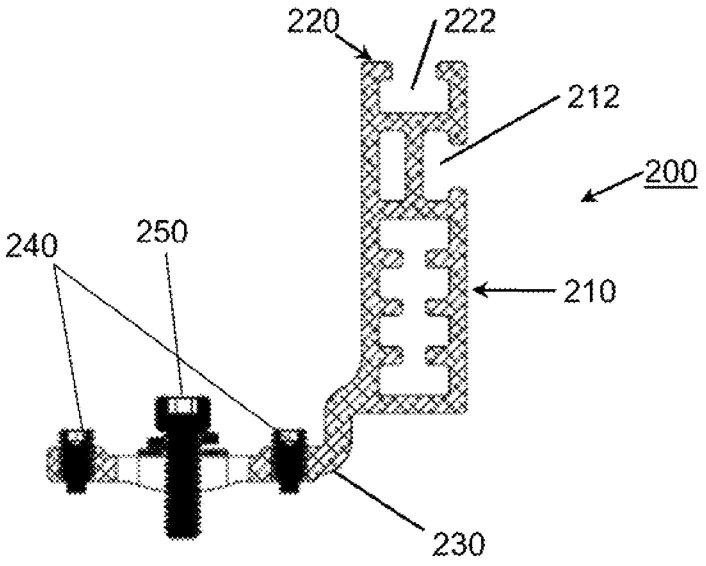
Figure 44:
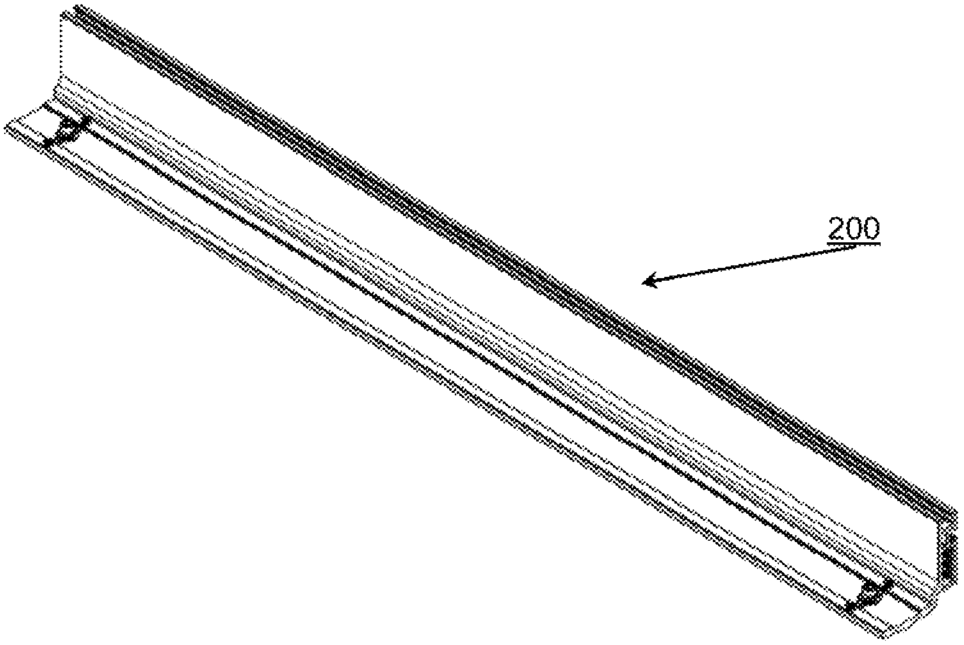
Figure 45:
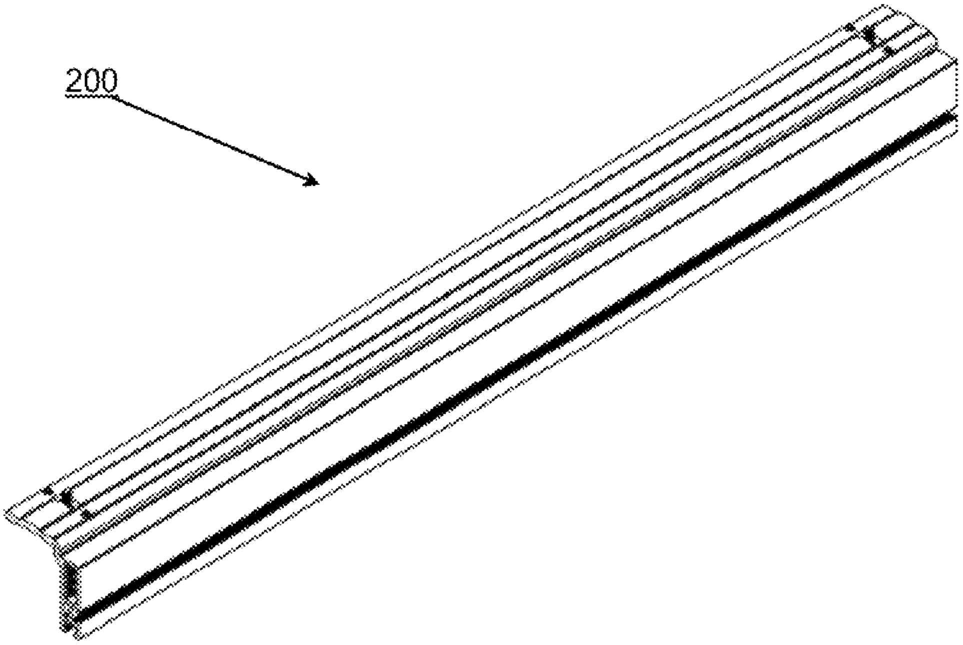

Referring to FIG. 36, depicted therein is a partial perspective view of an embodiment of the sliding work fence 110, which includes a locking mechanism 210. In one embodiment, the locking mechanism operates in a manner such that the movement of the outer member may be selectively altered between a sliding mode, where it is able to freely slide relative to the inner member, and a locked mode where it is locked to stop further sliding relative to the inner member. As will be appreciated, the locking mechanism 210 may include a handle 220, on the end of lever arm 224, which operates a cam 228. When the handle is in a "sliding" position, the cam 228 does not cause pawl 232 to engage teeth 236, but in a "locked" position, the cam causes the pawl to engage the teeth and prevents the outer member 150 from sliding relative to inner member 120.

The lock or brake mechanism 210 is intended to remain engaged until the user manually moves the handle/lever 220 in the direction they want the fence to move in. At the time that the fence is moved in the forward direction the sliding outer member 150 will engage the workpiece while finishing the cut. While ripping a board of any length on a table saw, when the tail end of the board is on the table saw surface and you are ready to finish the cut the sliding fence provides the ability to slide the outer member 150 forward with release of the locking mechanism 210, so the outer member 150 engages the tail end of the workpiece along with, for example, hold downs (not shown) that are mounted in the T-slots on face 158 to apply downward pressure. As a result the workpiece may be moved forward through the end of the cut with the operator safely away from the cutting blade.

Also illustrated in FIG. 36 is a mechanism for attaching the sliding work fence to an existing stationary fence (see also 205, 305, etc.). For example, the inner member 120 may have attached to surface 128, via longitudinal T-slots or channels 126, multiple generally V-shaped vertical channels 190 that are designed to receive a mating V-shaped member (not shown) attached on the face of the stationary fence 106. Use of the T-slot for receiving one or more fastening mechanisms permits the inner member 120 to be removably affixed to an existing work fence or other mounting mechanisms associated with the work surface (e.g., fixed mounts or the slidable fence mounts of another manufacturer's work fence).

Figure 29:
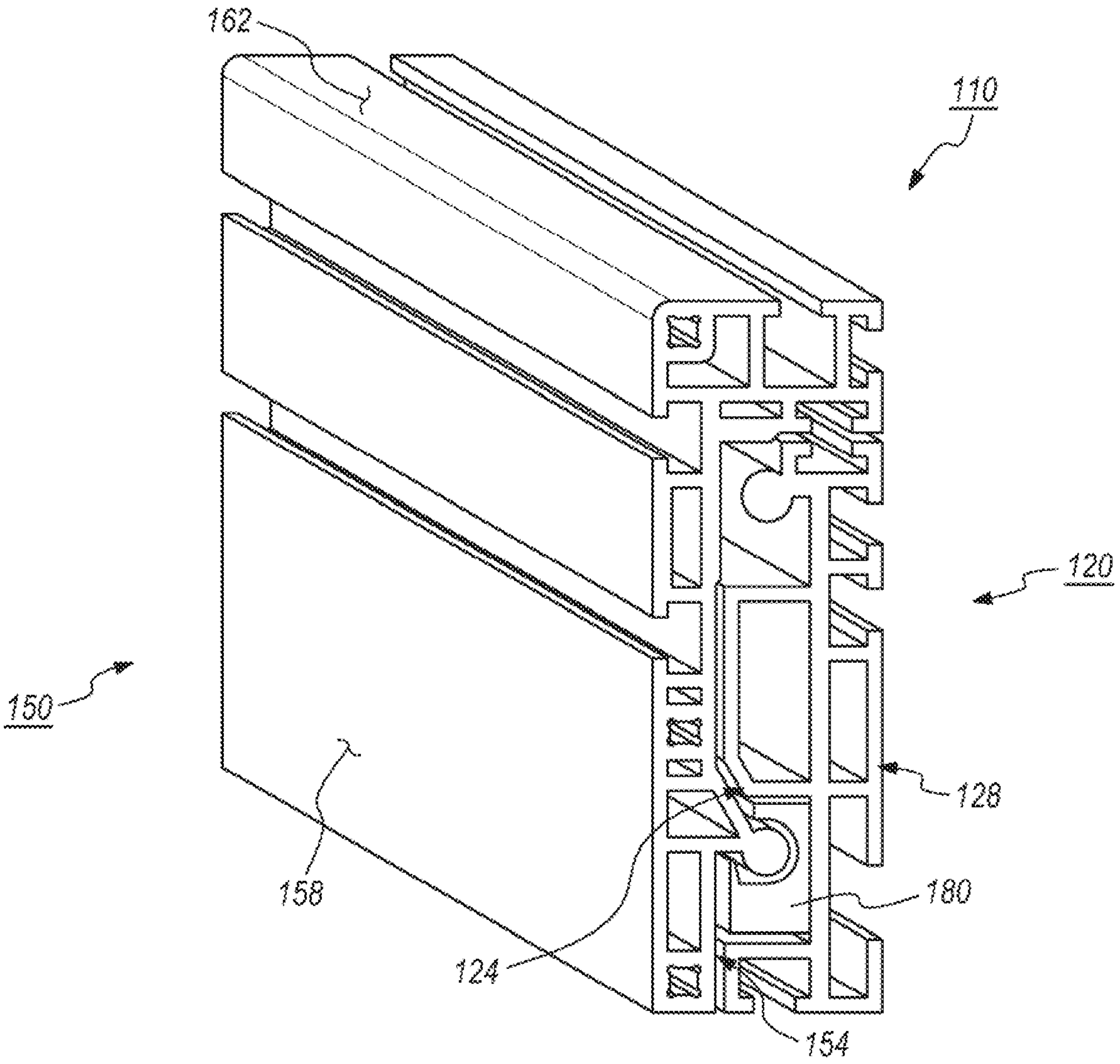
FIG. 29 is a view of an end of one embodiment of a sliding work fence.
Figure 30:
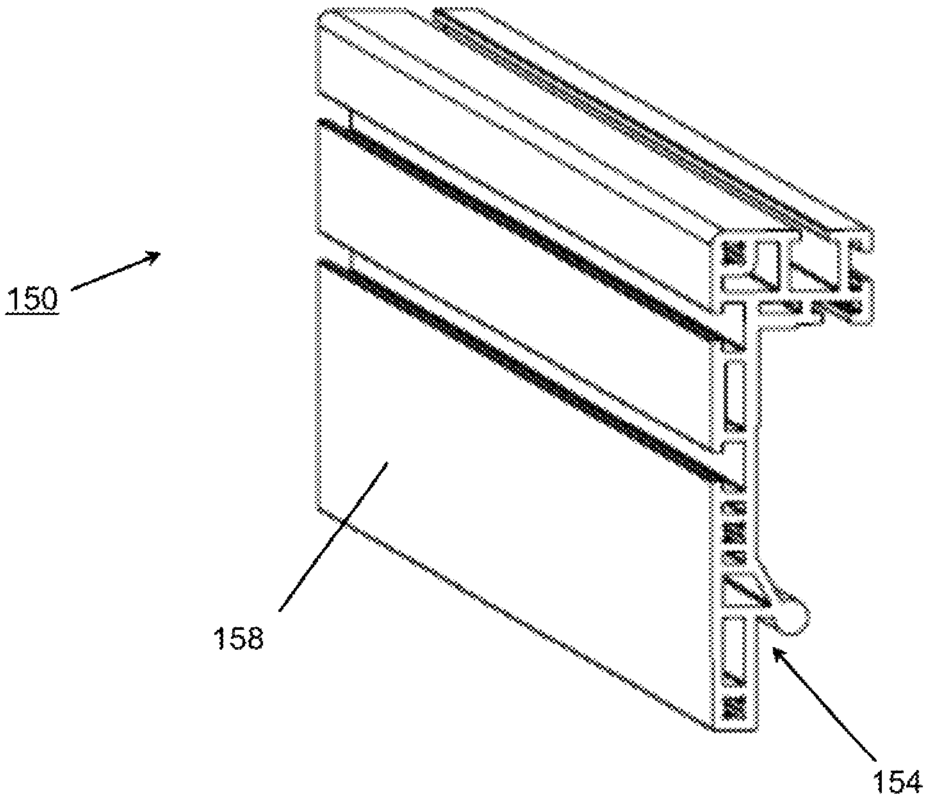
FIG. 30 is a partial perspective end view of an outer member of the sliding work fence embodiment of FIG. 29.
Figure 31:
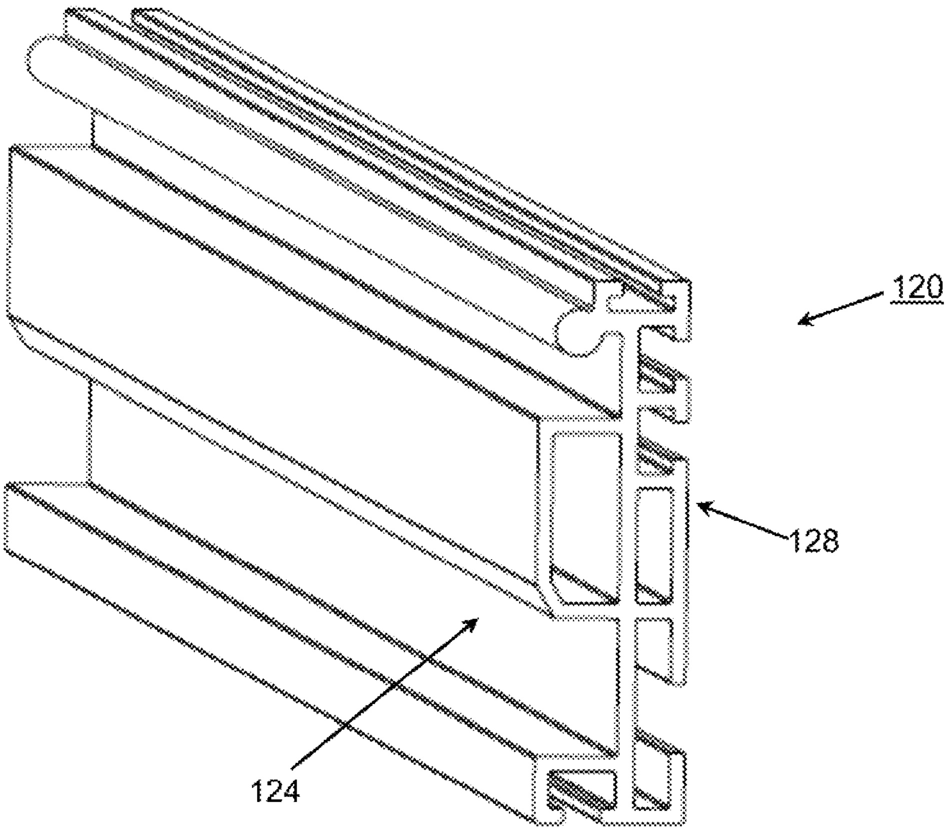
FIG. 31 is partial perspective end view of an inner member of the sliding work fence embodiment of FIG. 29.
Figure 32:
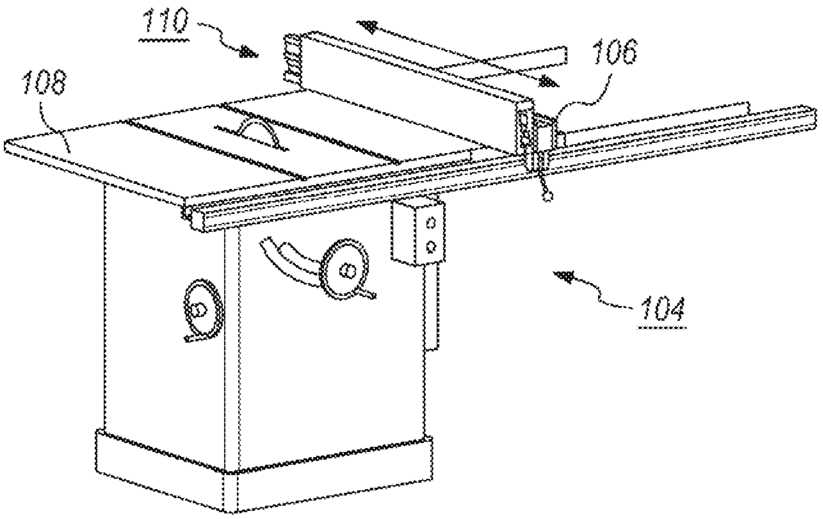
FIGS. 32 and 33 are views of a table saw with the sliding work fence operatively connected to the table, and illustrating the sliding work fence in unextended and extended positions, respectively.
Figure 33:
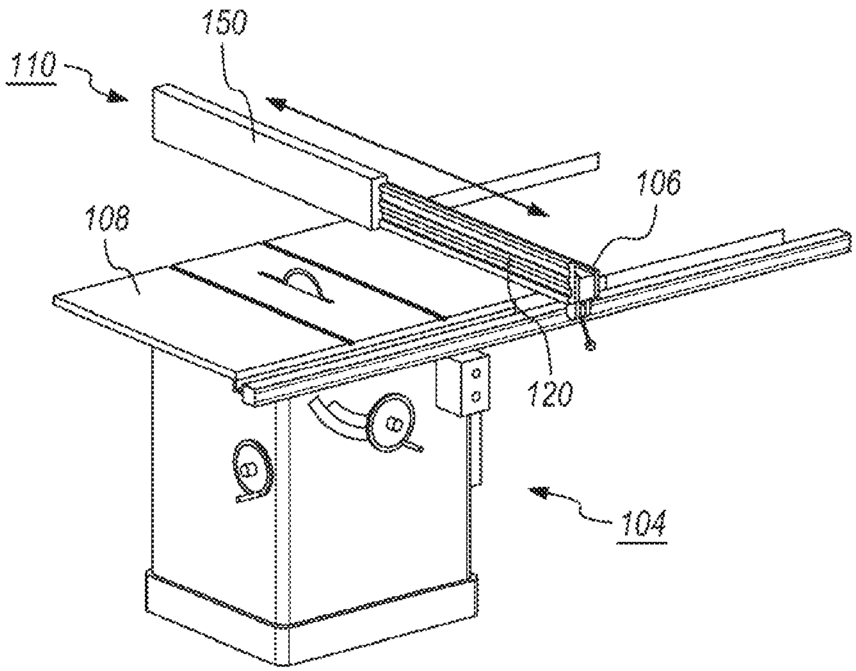
Figure 35:
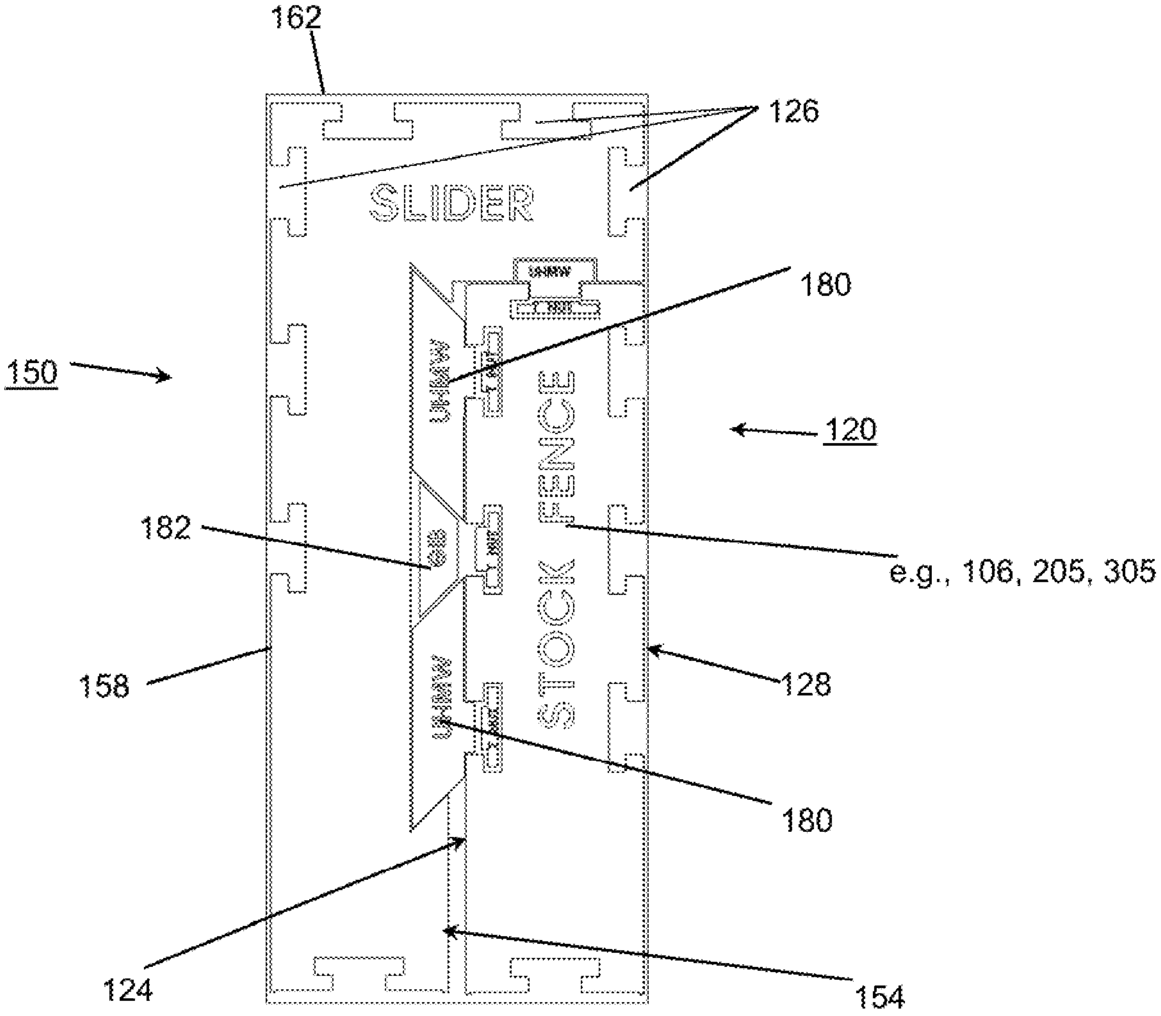
FIG. 35 is an end cross-sectional view of an alternative sliding work fence configuration.

As shown in the embodiments of the sliding work fence 110, outer member 150 further includes at least one T-slot or channel 126 extending longitudinally along at least a surface (s) of the outer member. The T-slot is suitable for receiving one or more fastening mechanisms there, thus permitting other devices to be removably affixed to the surface(s) of the outer member. For example, as seen in FIGS. 29 and 35, at least one T-slot 126 is located on both the second or vertical surface 158 and the top edge or surface 162 of the outer member 150.

Similarly, inner member 120 includes a second surface 128 facing away from the outer member and the workpiece, and toward stationary fence 106 to which it may be attached. And the first surface 124 is slidably interjoined with the first surface 154 of the outer member 150. To permit the "frictionless" sliding of the outer member relative to the stationary inner member, at least one bushing 180 is operatively placed to slidably connect the inner member 120 to the outer member 150, the bushing presenting a reduced friction surface to at least one of the inner or outer members to facilitate sliding of the outer member relative to the inner member along a longitudinal direction. In one embodiment the bushings 180 may be made from an ultra-high molecular weight material. Moreover, as depicted in FIG. 35, for example, the bushing may be retained in position relative to one member using a mechanical fastening such as gib 182. As illustrated in FIG. 29, for example, the bushing 180 is suitable for placement in at least two orientations to slidably interconnect features on the first surface of the inner member to features on the first surface of the outer member.

As will be further appreciated, for example from FIGS. 28 and 34, the sliding work fence also serves as a tall accessory fence that allows use of attachments on the sliding portion of the fence like a tenon jig or frame splining jig, or simply be tall enough to add hold downs, or work on the edge of tall panels providing support while vertical. The disclosed embodiments of the sliding work fence may also be used as any other fence if one chooses to use it that way. This makes it more of a replacement fence than just an accessory fence. And as disclosed above, the embodiments contemplated include an option to clamp or affix the sliding fence (e.g., member 120) to the existing fence or, for some types of fences, to slide the manufacturer's fence off its mount and slide at least the outer member of the sliding work fence on.

Turning the FIGS. 37 and 39-45, embodiments of a custom fence extension 200 that mounts to and enhances existing fence styles are depicted. In these figures, a vertical fence extension is designed to sit atop a conventional fence 205 such as a Beisemeyer-type fence or the like. The fence extension includes a fence face 210 having a longitudinal T-slot 212 extending horizontally along the face at a position near or adjacent the top surface 220. And, the top edge or surface 220 also has a longitudinal T-slot 222 therein. Extending backward from the bottom of fence extension 200 is a formed flange 230, where the size, shape and offset of the flange 230 are designed in a manner to fit against the top surface of a conventional fence, and allow for the bottom surface of the fence extension to sit upon or adjacent the top surface of conventional fence 205. The flange 230 further includes one or more pairs of jacking screws 240 on opposite sides of the flange, and preferably located adjacent an attachment screw or similar fastener 250 (e.g., quick-disconnect cam lock, pin with spring detent, or the like) to allow for the fence extension to be adjusted to be coplanar with the face of conventional fence 205.

As with the sliding fence disclosed above, the fence extension 200 is made of an extruded material. Moreover, although not depicted, the mounting flange and fence extension configuration may be fitted with a sliding fence face in order to provide the option of adding a taller sliding fence on the conventional fence 205.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. An extended work fence apparatus for use on a work table, comprising:

a linearly-extruded, extended fence member for attachment to a pre-existing work fence adjustably connected to the work table;

at least two attachment mechanisms to operatively connect the extended fence member to the pre-existing work fence, where said extended fence member is of a length greater than the pre-existing work fence and includes a first surface including features for receiving the at least two attachment mechanisms and a second surface having a substantially planar portion extending a length thereof for contact with and guiding a workpiece before and across the work table; and at least one feed support adjustably affixed to said extended fence member.

2. The apparatus according to claim 1, wherein said extended fence member further includes at least one slot extending longitudinally along at least one of the first surface and the second surface, said slot suitable for receiving one or more fastening mechanisms thereby permitting other devices to be removably affixed to the extended fence member.

3. The apparatus according to claim 2, wherein at least one slot is located on both the first surface, the second surface and a top surface of the extended fence member.

4. The apparatus according to claim 3, wherein said extended fence member further includes at least one slot extending longitudinally along a bottom surface thereof.

5. The apparatus according to claim 4, wherein each of the slots located on the first surface, the second surface, the top surface and the bottom surface of the extended fence member are T-slots.

6. The apparatus according to claim 1, wherein said at least two attachment mechanisms include adjustable clamps.

7. The apparatus according to claim 6, wherein each of said adjustable clamps are T-track clamps including:

an arm for operatively engaging the extended fence member, and an adjustable member, moving relative to the arm, for releasably clamping the pre-existing work fence between the adjustable member and the first surface of the extended fence member.

8. The apparatus according to claim 7, wherein the arm operatively engages the extended fence member by insertion of the arm into a vertical slot on the first surface.

9. The apparatus according to claim 8, wherein the vertical slot extends downward from an edge of the first surface and below a longitudinal T-slot so that the arm, when fully inserted into the vertical slot, does not interfere with the longitudinal T-slot.

10. The apparatus according to claim 2 wherein a height (H) of the at least one slot on the second surface of the extended fence is greater than a minimum operable distance (D) of a featherboard attached to the extended fence using the at least one slot.

11. The apparatus according to claim 1 wherein at least one slot is located on a bottom surface of the extended fence member, and a plurality of low-friction standoffs are inserted therein to assure separation between the extended fence member and an upper surface of the work table.

12. The apparatus according to claim 1 wherein the extended fence member includes:

an inner linearly-extruded member comprising the first surface, for attachment to a pre-existing work fence on the work table; and an outer linearly-extruded member, slidably engaged with the inner linearly-extruded member, said outer member comprising the second surface.

13. The apparatus according to claim 1, wherein the at least one feed support includes at least one feature that adjustably engages with a slot on the extended fence member.

14. The apparatus according to claim 13, wherein the at least one feature includes a nub that self-aligns and engages with at least a bottom-facing slot on the extended fence member.

15. The apparatus according to claim 13, wherein the at least one feature includes a fastener in combination with a tightening mechanism that engages with at least a bottom-facing slot on the extended fence member.

16. The apparatus according to claim 15, wherein the fastener includes a T-bolt fastener that, in combination with the tightening mechanism, engages with at least a bottom-facing slot on the extended fence member.

17. The apparatus according to claim 1, wherein the at least one feed support is adjustably affixed to said extended fence member via a slot extending longitudinally along a bottom surface thereof.

18. The apparatus according to claim 1, wherein said feed support includes an upper horizontal surface for supporting the workpiece.

19. The apparatus according to claim 18, wherein the upper horizontal surface is a feature of a body having a generally L-shaped cross section, the body further including an inner vertical face where the upper horizontal surface intersects the inner vertical face at a right angle; and the body further includes at least one feature that slidably engages with a slot on the extended fence member.

20. The apparatus according to claim 19, wherein the feed support further includes at least one releasable connector for affixing the feed support to the at least one slot, such that the feed support remains stationary relative to the extended fence member when the at least one releasable connector is tightened, and the feed support is capable of supporting a workpiece beyond an edge of the work table.

21. The apparatus according to claim 1, wherein said feed support includes:

a body having a generally L-shaped cross section, with an inner vertical face and an upper horizontal surface intersecting at a right angle; and at least one adjustable connector for affixing the feed support to the at least one slot, so that the feed support is stationary relative to the said extended fence member, and capable of supporting a workpiece beyond an edge of the work table.

22. An extended work fence apparatus for use on a work table, comprising:

a linearly-extruded, extended fence member for attachment to a pre-existing work fence adjustably connected to the work table;

at least two attachment mechanisms to operatively connect the extended fence member to the pre-existing work fence, wherein said extended fence member further includes at least one T-slot extending longitudinally along at least one of the first surface and the second surface, said T-slot suitable for receiving one or more fastening mechanisms thereby permitting other devices to be removably affixed to the extended fence member and where said extended fence member is of a length greater than the pre-existing work fence and includes a first surface including features for receiving the at least two attachment mechanisms and a second surface having a substantially planar portion extending a length thereof, said extended fence being suitable for guiding a workpiece on the work table; and at least one feed support for attachment to said extended fence member, wherein said feed support comprises:

a body having a generally L-shaped cross section, with an inner vertical face and an upper horizontal surface intersecting at a right angle; and at least one adjustable connector for affixing the feed support to the at least one T-slot, so that the feed support is stationary relative to the said extended fence member, and capable of supporting a workpiece beyond the edge of the work table.

23. The apparatus according to claim 22, wherein said feed support further comprises at least one feature for operatively receiving a vertical support leg therein.

24. The apparatus according to claim 23, wherein a bottom horizontal surface thereof includes a recessed pocket for receiving an upper end of the vertical support leg.

25. An extended work fence apparatus for use on a work table, comprising:

a linearly-extruded, extended fence member for attachment to a pre-existing work fence adjustably connected to the work table;

at least two attachment mechanisms to operatively connect the extended fence member to the pre-existing work fence, wherein said extended fence member further includes at least one T-slot extending longitudinally along at least one of the first surface and the second surface, said T-slot suitable for receiving one or more fastening mechanisms thereby permitting other devices to be removably affixed to the extended fence member and where said extended fence member is of a length greater than the pre-existing work fence and includes a first surface including features for receiving the at least two attachment mechanisms and a second surface having a substantially planar portion extending a length thereof, said extended fence being suitable for guiding a workpiece on the work table; and at least one feed support for attachment to said extended fence member, wherein said feed support comprises:

a body having a generally L-shaped cross section, with an inner vertical face that contacts the first surface of said extended fence member and an upper horizontal surface intersecting the inner vertical surface at a right angle, a portion of the upper horizontal surface of the feed support contacting a lower edge of the extended fence member; and a plurality of adjustable connectors for adjustably affixing the feed support to the at least one T-slot of the extended fence member.

26. The apparatus according to claim 25, where the extended fence member includes a lower longitudinal T-slot in the first surface adjacent a lower edge of the extended fence member and a bottom longitudinal T-slot in the lower edge of the extended fence member, and where the plurality of adjustable connectors for adjustably affixing the feed support to the extended fence member engage both the lower longitudinal T-slot and the bottom longitudinal T-slot.

* * * * *